United States Patent
Monti et al.

(10) Patent No.: US 11,055,355 B1
(45) Date of Patent: Jul. 6, 2021

(54) QUERY PARAPHRASING

(71) Applicant: Amazon Technologies, Inc., Seattle, WA (US)

(72) Inventors: Emilio Fabio Monti, Cambridge (GB); Anjishnu Kumar, Cambridge (GB); David Spike Palfrey, Cambridge (GB); Sainyam Kapoor, Cambridge (GB); Janez Starc, Cambridge (GB); Samuel Tucker, Minneapolis, MN (US)

(73) Assignee: Amazon Technologies, Inc., Seattle, WA (US)

( * ) Notice: Subject to any disclaimer, the term of this patent is extended or adjusted under 35 U.S.C. 154(b) by 136 days.

(21) Appl. No.: 16/017,032

(22) Filed: Jun. 25, 2018

(51) Int. Cl.
*G06F 16/9032* (2019.01)
*G10L 15/183* (2013.01)
*G10L 15/22* (2006.01)

(52) U.S. Cl.
CPC ...... *G06F 16/90332* (2019.01); *G10L 15/183* (2013.01); *G10L 15/22* (2013.01); *G10L 2015/225* (2013.01)

(58) Field of Classification Search
USPC ........................................ 704/270–271, 7–10
See application file for complete search history.

(56) References Cited

U.S. PATENT DOCUMENTS

| | | | |
|---|---|---|---|
| 8,606,739 B2* | 12/2013 | Apacible | G06F 16/334 706/50 |
| 10,248,689 B2* | 4/2019 | Brennan | G06F 16/24522 |
| 10,430,426 B2* | 10/2019 | Byron | G06F 16/24578 |
| 2006/0167842 A1* | 7/2006 | Watson | G06F 16/3322 |
| 2009/0259624 A1* | 10/2009 | DeMaris | G06F 16/24534 |
| 2010/0010803 A1* | 1/2010 | Ishikawa | G06F 17/2795 704/9 |
| 2012/0005219 A1* | 1/2012 | Apacible | G06F 16/334 707/768 |
| 2016/0085820 A1* | 3/2016 | Chadha | G06F 16/9535 707/776 |
| 2016/0085821 A1* | 3/2016 | Chadha | G06F 16/2462 707/776 |
| 2017/0103069 A1* | 4/2017 | Brennan | G06F 16/24522 |
| 2017/0109354 A1* | 4/2017 | Boxwell | G06N 3/006 |
| 2017/0109434 A1* | 4/2017 | Boxwell | G06F 16/3329 |
| 2017/0322939 A1* | 11/2017 | Byron | G06N 20/00 |
| 2019/0115008 A1* | 4/2019 | Jiang | G10L 15/22 |
| 2019/0163756 A1* | 5/2019 | Bull | G06F 16/248 |

* cited by examiner

*Primary Examiner* — Leonard Saint Cyr
(74) *Attorney, Agent, or Firm* — EIP US LLP

(57) ABSTRACT

A method comprising sending query data representative of a query to a first and second query-answering subsystem of a query-answering system. It is determined that the query-answering system lacks a satisfactory answer to the query. Paraphrase data representative of a rephrased version of the query is received. The paraphrase data is sent to the first and second query-answering subsystems. Answer data representative of an answer to the rephrased version of the query is received from the first query-answering subsystem.

20 Claims, 10 Drawing Sheets

QUERY PARAPHRASING

BACKGROUND

Computer-based query-answering systems can provide answers to queries, which may be submitted by users in the form of text or speech, for example. However, the effectiveness of such systems for answering queries may be improved, for example to increase the number of queries for which an answer or a satisfactory answer is obtained.

DETAILED DESCRIPTION

Figure 1:
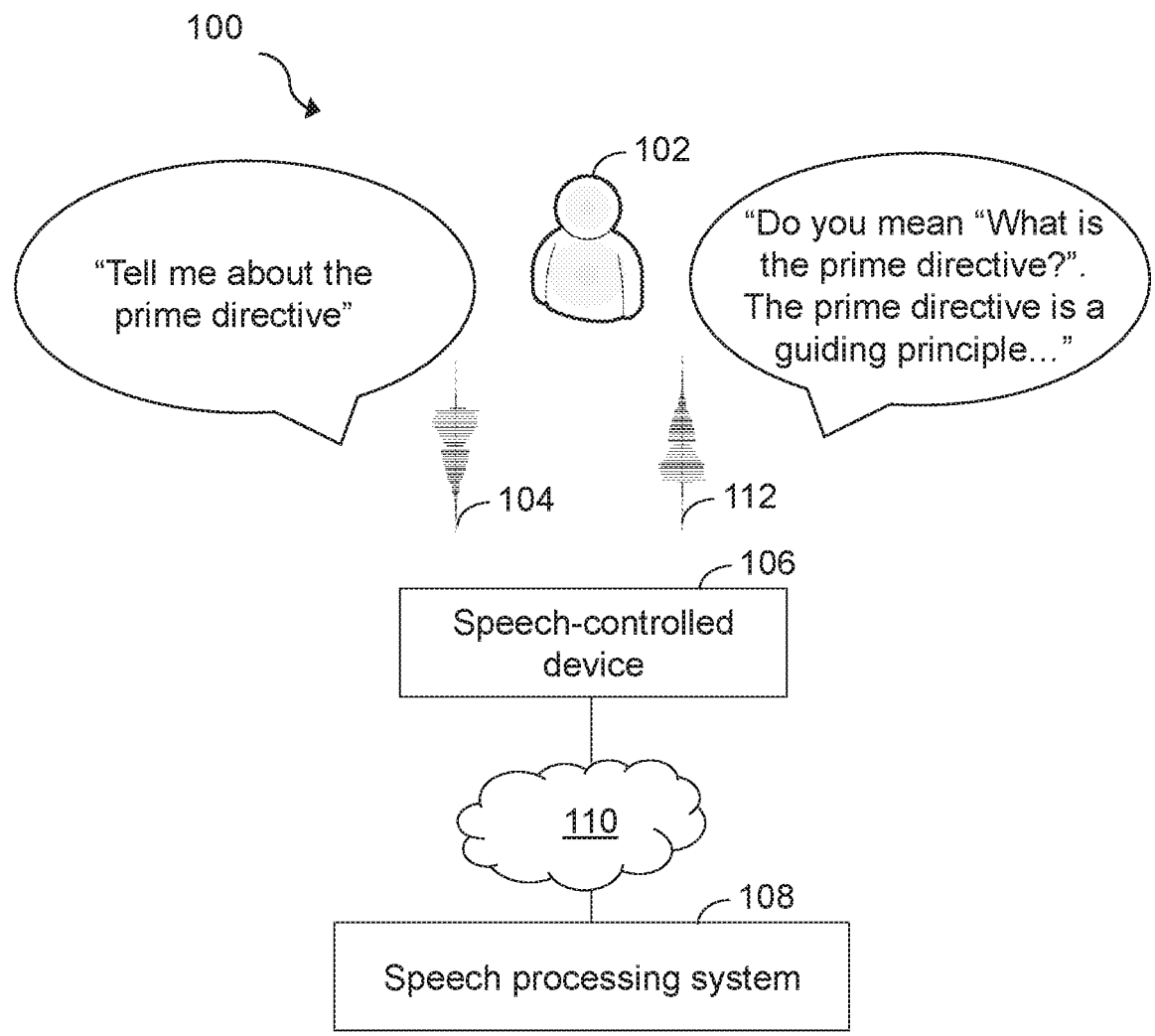
FIG. 1 illustrates schematically an example of system arranged to provide an answer to a query by rephrasing the query.

Natural language processing (NLP) is a field of computer science, artificial intelligence, and linguistics concerned with the interactions between computers and human languages. Natural language processing can include natural language understanding (NLU), which deals with machine reading comprehension, enabling computers to derive meaning from text data representative of natural language.

A user may submit a query to a system arranged to perform NLP. In examples herein, a natural language understanding (NLU) system may be used to understand from text data (e.g., typed by a user, generated using automatic speech recognition processing, etc.) that a query is being asked, and what the query is. A data representation of the query may be sent to a query-answering system, which may include a plurality of different query-answering subsystems. However, it is possible that the query-answering system does not include any answers to the query with a confidence level above a threshold confidence level. In other words, the query-answering system may not be able to determine with a sufficient degree of certainty that the answers obtained by the query-answering system do indeed satisfactorily answer the query. For example, the plurality of query-answering subsystems may lack an answer or a satisfactory answer to the query. In examples herein, a rephrased version of the query may be obtained. The query may be paraphrased to obtain the rephrased version of the query, for example by removing commonly used words such as "the", or by replacing words with synonyms. The rephrased version of the query may for example correspond to a previously-answered query to which the query-answering system includes an answer with a confidence level above the threshold confidence level. This answer can then be returned, and the query can be answered successfully. Paraphrasing the query therefore increases the likelihood that a query-answering system will be able to answer the query with a satisfactory answer.

Furthermore, when interacting with computer systems in order to seek answers to queries, humans do not always phrase queries clearly. For example, queries may not be grammatically correct or may include extraneous words. This may be the case for example when queries are received as speech and then converted to text. Such queries may be more informal compared to queries submitted as text and may include repetition or filler words such as "you know" or "like". The query-answering system may lack an answer or a satisfactory answer to a relatively informal query. However, by rephrasing such a query, an answer may be obtained from the query-answering system, improving the success rate of the system.

Examples described herein therefore improve the interaction between humans and a computer system for providing answers to queries, allowing such a computer system to more reliably return a satisfactory answer to queries, which may be worded in very different ways. These examples may therefore be more flexible than existing systems and may allow answers to queries worded in a greater variety of different ways to be retrieved. The quality of the user experience may therefore be improved.

FIG. 1 illustrates schematically an example of system 100 arranged to provide an answer to a query by rephrasing the query. A user 102 utters a query 104, which in this example is "Tell me about the prime directive". The query 104 is received by a speech-controlled device 106, which transmits the query 104 to a speech processing system 108, via a network 110. Features of the speech-controlled device and the speech processing system 108 are described in detail below with reference to FIGS. 14 and 15.

The speech processing system 108 includes a natural language understanding (NLU) system (an example of which is discussed in connection with FIGS. 11, 14 and 15). NLU typically allows a structured representation of an input (such as a query) to be generated, which may be referred to as an understanding. Such a representation can be consumed by a query-answering system (as described further below) to generate an answer. However, in other examples, the input may be consumed by the query-answering system without first being processed by the NLU system. An understanding may or may not have internal structure. An understanding may for example represent the meaning of a query as a query over a knowledge base. An NLU subsystem may return confidence data or other metadata indicative of a process used to understand the query (although this is not necessary). In examples, an NLU system may include a plurality of NLU subsystems, which may each use a different approach to obtain a representation of an input. This is described further below with reference to FIGS. 11 and 12.

The speech processing system 108 also includes a query-answering system. A query-answering system may include a plurality of query-answering subsystems, which may each use a different approach in an attempt to obtain an answer to a query. For example, the query-answering system may include a first query-answering subsystem and a second query-answering subsystem, which may be different from the first query-answering subsystem. This is described further below with reference to FIGS. 11, 13, 14 and 15.

In the example of FIG. 1, the query-answering system lacks an answer to the query 104. For example, each of a plurality of query-answering subsystems of the query-answering system may lack an answer to the query 104. In response to determining that the query-answering system lacks an answer to the query 104, the query-answering system obtains a rephrased version of the query 104. A rephrased version of a query is for example a paraphrase of the query, in which words of the query are removed, reordered or replaced, for example. A rephrased version of a query may therefore be considered to be a rewording or other restatement of the query which nevertheless aims to capture the same meaning as that present in the original query. For example, if a query is rephrased correctly, an answer to the rephrased query may be the same as the answer to the initial query. In this case, the original query 104 is "Tell me about the prime directive". In rephrasing the query 104, the words "Tell me about" are removed from the query 104 and replaced with "What is" to provide a rephrased version of the query, which in this case is "What is the prime directive?". The answer to both the query 104 and the rephrased version of the query in FIG. 1 is the same (namely, a description of what the prime directive is). It is to be appreciated that there are typically many different ways in which a query may be rephrased or otherwise reworded. There may therefore be many possible paraphrases or other rephrased versions of a query. Some of these rephrased versions may more accurately or more clearly capture the underlying meaning of the query than others, though.

In the example of FIG. 1, the rephrased version of the query is resubmitted to the query-answering system, for example to the plurality of query-answering subsystems which lacked an answer to the initial query. In this example, the speech processing system 108 is able to retrieve an answer to the rephrased version of the query from the query-answering system, for example from at least one of the query-answering subsystems. The answer may then be returned to the user. In the example of FIG. 1, the answer is received from the query-answering system in the form of text data and is converted from the text data to audio data, although other data formats are possible.

In examples such as this, a higher success rate for answering a query may be achieved by rephrasing the query. Moreover, systems in accordance with such examples may exhibit reduced sensitivity to the syntax or grammar in queries, which may be non-standard in normal human speech. In this way, such systems may provide improved flexibility for answering queries worded in an unusual manner or with additional or unnecessary words, as may occur during human speech. The interface between users and these systems may therefore be improved, as users may have increased freedom in how queries are worded while maintaining a high success rate for obtaining answers to such queries.

Systems in accordance with examples such as this may separate the function of understanding an input from the function of answering a query in the input. In this way, different approaches may be used to understand an intent of a user (for example to understand that a query is being asked) and to answer the query. This may increase the success rate for obtaining an answer to the query compared with systems in which the same approach is used for both understanding and answering a query. For example, as described further below, a representation of the query may be obtained from an NLU subsystem as a query over a particular knowledge base. However, this representation may be used to obtain an answer to the query from a different knowledge base (which may form part of a query-answering subsystem), or using a query-answering subsystem which does not involve the use of a knowledge base.

Paraphrasing of the query may be considered to be an additional way of obtaining an understanding of the query. Hence, a paraphrasing system may be considered to be an NLU subsystem of the NLU system. By providing an additional approach to obtaining a representation of a query, which may be input to a plurality of different query-answering subsystems of the query-answering system, the flexibility and success rate may be further improved.

In FIG. 1, audio data 112 is generated and played to the user by the speech-controlled device 106. The audio data 112 represents audio which includes both the answer to the rephrased version of the query as well as the rephrased version of the query itself. In this example, the rephrased version of the query is "What is the prime directive?" and the answer is "The prime directive is a guiding principle . . . ". By returning both the rephrased version of the query as well as the answer to the rephrased query, the user receives an indication that rephrasing has occurred. This may allow the user to tailor feedback to the speech-controlled device. For example, the user may be able to provide feedback that the answer is the correct answer to the rephrased version of the query, but that the rephrased version of the query fails to satisfactorily capture the meaning of the query. Alternatively, the user may be able to provide feedback that the rephrased version of the query satisfactorily captures the meaning of the query but the answer to the rephrased version of the query is incorrect. This may therefore allow more accurate feedback to be obtained, which may be used to further improve the speech processing system 108 for future queries.

The example of FIG. 1 is a simplified example, which aims to illustrate features that may be present in other examples described herein, to put these examples into context. These examples will now be described with reference to FIGS. 2 to 15.

Figure 2:
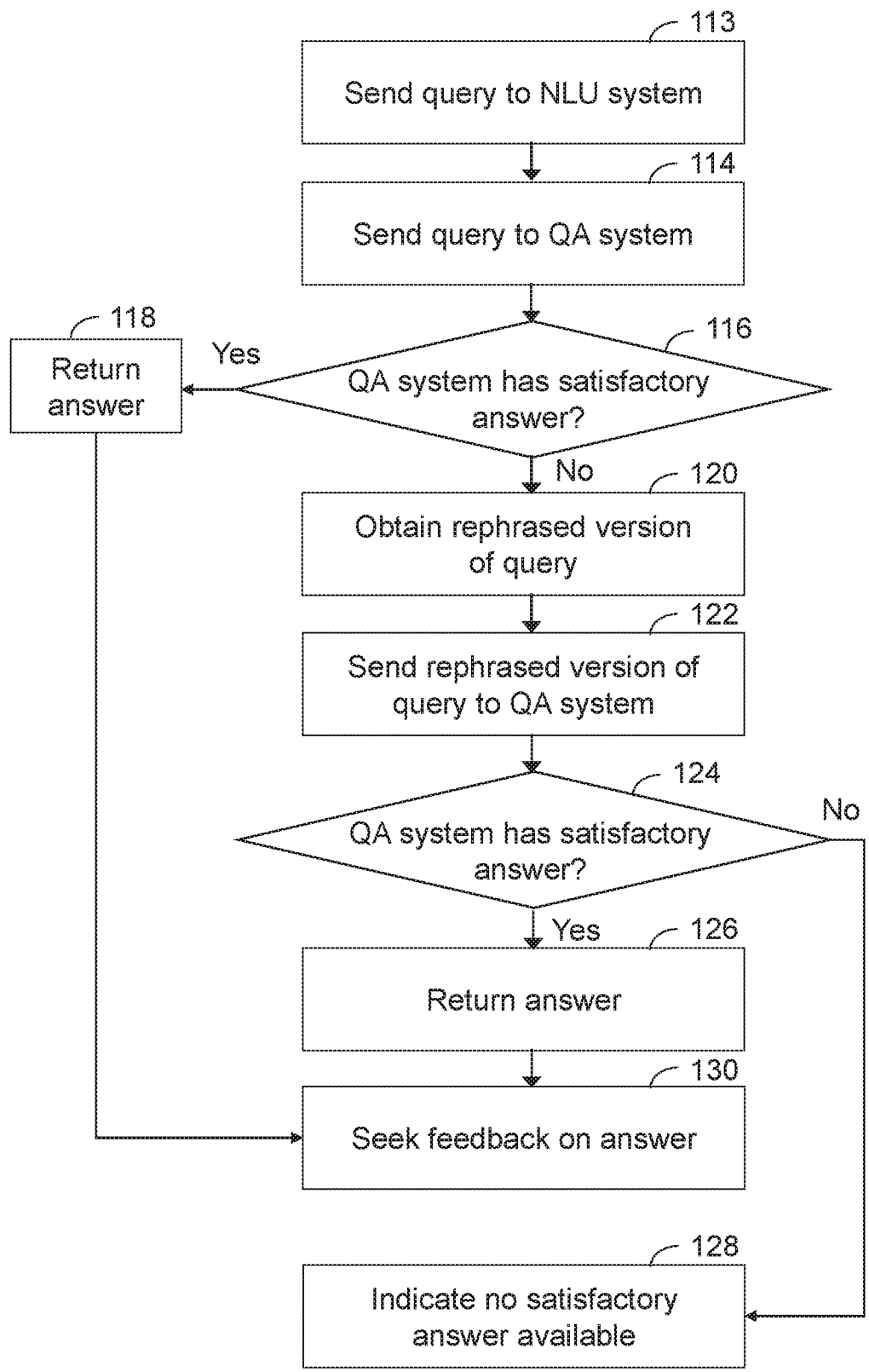
FIG. 2 is a flow diagram showing a method of rephrasing a query according to examples.

FIG. 2 is a flow diagram showing a method of rephrasing a query according to examples. At item 113 of FIG. 2, query data representative of a query is sent to an NLU system, such as the NLU system discussed further below with reference to FIGS. 11 and 12. As explained with reference to FIG. 1, the query may have been received as a spoken utterance. Alternatively, the query may have been received in another format, such as in the form of text. A query may be considered to be any sentence or other series of words or text to elicit a response from a computer-implemented system, such as a speech-controlled device. The query for example represents a question that the user is seeking an answer to. For example, typical queries may be expressed in a form that ends with a question mark (although they may alternatively be worded as commands). For example, the command "Tell me the time" may be reworded as "What is the time?" and may therefore be considered to correspond to a query.

In examples in which a spoken utterance comprises a query, the spoken utterance may be converted to first text data, which for example provides a textual representation of the query. Conversion of speech to text is described further below with reference to FIG. 14. The first text data may then be sent to the NLU system. The first text data may be sent to a first NLU subsystem of the NLU system, which may also include a second NLU subsystem. In other words, the NLU system may include a plurality of different NLU subsystems. In examples such as this, the second NLU subsystem may be or include a paraphrasing system, which may be used to obtain a rephrased version of the query. A representation of the query received from the NLU system (for example from the first NLU subsystem) may then be sent to the query-answering system at item 114 of FIG. 2. The representation may be sent to each of a plurality of query-answering subsystems of the query-answering system, which may be similar to or the same as the query-answering system discussed further below with FIGS. 11, 13, 14 and 15. In other examples, though, the query may be processed by the NLU system in parallel with processing of the query by the query-answering system. In such examples, the processing of items 113 and 114 may occur at the same time as each other or part of the processing of item 113 may be performed at the same time as part of the processing of item 114 (such that the processing of items 113 and 114 partially, but not fully, overlaps each other in time). In such cases, the query itself (for example as represented by the first text data) may be sent to the query-answering system before the NLU system determines that the intent of the input received from the user (for example in the form of a spoken utterance or text data) is to ask a query. However, a response obtained from the query-answering system may be returned to the user after determination by the NLU system that the user is intending to ask a query. In examples such as this, the query data (which may be in the form of the first text data), may be sent to each of a plurality of query-answering subsystems, such as to a first and second query-answering subsystem.

Before sending the query to the query-answering system, the query may be formatted in a common data format which may be processed using each of the plurality of query-answering subsystems of the query-answering system. Such a common data format may be considered to be a predetermined data format, which may be selected prior to sending the query to the query-answering system. For example, it may be more efficient for each of the query-answering subsystems to receive inputs in different data formats, respectively. For example, it may be more efficient for one of the query-answering subsystems to receive input in the form of text, whereas another of the query-answering subsystems may more efficiently process numerical input, for example in the form of a vector. However, in some examples, the query may nevertheless be formatted in the same data format regardless of which of the plurality of query-answering subsystems of the query-answering system the query is to be sent to, such as in the form of text data. This may improve the flexibility of the query-answering system and reduce overheads during updates to the query-answering system. For example, different query-answering subsystems may be included or excluded from the query-answering system without altering the data format of the query if the query is in a data format that is generally compatible with various different query-answering subsystems. In such cases, each of the query-answering subsystems may convert the query to a different data format depending on the processing the respective query-answering subsystem is arranged to perform. For example, the query may be in the format of text representative of the query.

In examples in which the query is formatted such that it is compatible with a first query-answering subsystem and a second query-answering subsystem of the query-answering system, the method of FIG. 2 may include obtaining an intermediate representation of the query. For example, an intermediate representation of the query may be obtained from the NLU system or another system, which is compatible with the first query-answering subsystem. The intermediate representation of the query may, however, be incompatible with the second query-answering subsystem. A data format of a query may be considered to be compatible with a query-answering subsystem where the query-answering subsystem is able to successfully receive and process an input of the same data format as that of the query, without converting the query to a different data format. Conversely, a data format of the query may be considered to be incompatible with a query-answering subsystem where the query-answering subsystem is unable to process an input of the same data format as that of the query without conversion to a different data format. For example, a query-answering subsystem which is configured to receive an input in the form of text, may be unable to process a numerical input, such as a vector representation of a query, without converting the numerical input to text.

In some cases, the query may be converted to a data format which is incompatible with a plurality of query-answering subsystems without further processing of the query, for example to convert the query to a different data format which is compatible with the query-answering subsystem in question. Nevertheless, use of such a data format for the query may provide for increased flexibility across different query-answering subsystems (which may receive inputs from various different systems, such as different NLU subsystems), by providing for a predetermined data format, such as a standard or other common data format, for a query, which can be received by a plurality of different query-answering subsystems. This allows a different approach to be used for understanding a query, and answering the query. In effect, understanding the query and answering the query may be decoupled from each other and performed independently. As explained above, this may increase the likelihood of successfully answering the query.

At item 116 of FIG. 2 it is determined whether the query-answering system has a satisfactory answer to the query. This may include determining whether at least one of the plurality of query-answering subsystems of the query-answering system (such as at least one of the first or second query-answering subsystems) has a satisfactory answer. A satisfactory answer is for example an answer that fulfils the expectations or needs of a user. Answers that are satisfactory may be acceptable or tolerable without being outstanding or perfect. For example, a satisfactory answer may provide sufficient information to answer a query, without providing a large amount of detail. However, satisfactory answers in some cases may be of a high standard or may exceed a user's needs. A satisfactory answer is typically factually correct and may be provided in a timely manner.

It may be determined whether a particular answer is a satisfactory answer to a query based on feedback provided by users based on returning that particular answer to the query to the user. If a certain proportion of users provide positive feedback, indicating that that particular answer meets their expectations or needs, the particular answer may be considered to be a satisfactory answer. This is merely an example, though, and other methods may be used to determine whether a particular answer is satisfactory. For example, answers may be classified into satisfactory or unsatisfactory answers using a trained machine learning classifier. Alternatively, answers may be annotated, either by a human or by a computer-based method, as satisfactory or unsatisfactory answers to a given query.

If it is determined that the query-answering system has a satisfactory answer to the query, the query is returned to the user at item 118 of FIG. 2.

If, however, it is determined that the query-answering system lacks a satisfactory answer to the query, a rephrased version of the query is obtained at item 120 of FIG. 2. The determination of whether the query-answering system lacks a satisfactory answer to the query may for example be based on determining at least one of: that the query-answering system lacks any answer to the query, that the query-answering system comprises an unreliable answer to the query, or that the query-answering system has not provided any answer to the query within a predetermined time period. As explained above, this may include determining whether the plurality of query-answering subsystems lack a satisfactory answer to the query.

Determination of whether the query-answering system lacks a satisfactory answer to the query need not involve the receipt of a message or other data (although it may do). For example, a failure message may be received from the query-answering system indicating that the query-answering system lacks any answer to the query. Alternatively, though, the query-answering system may not send an answer or a failure message, at all or within a predetermined time period. The predetermined time period may be set based on an intended response time for responding to the user with an answer to the query. In such cases, the lack of an answer (or other data) within the predetermined time period may indicate that the query-answering has not provided any answer within the predetermined time period or that the query-answering system lacks any answer to the query. It may nevertheless be determined, regardless of the exact reason why the query-answering system has failed to respond within the predetermined time period, that the query-answering system lacks a satisfactory answer to the query.

In other examples, determining that the query-answering system lacks a satisfactory answer to the query may include receiving an answer to the query from the query-answering system and determining that the answer is unreliable. This determination may be made in various different ways. For example, the reliability of the answer may be determined based on a query-answering subsystem of the query-answering system which has provided the answer. For example, a first query-answering subsystem may be more reliable than a second query-answering subsystem. In such cases, answers returned by the second query-answering subsystem may be considered unreliable and receipt of answers answered by the second query-answering subsystem may be considered to correspond to obtaining the second indication. In other cases, the reliability of an answer may be determined based on feedback data, which for example represents user feedback. For example, users may have previously provided feedback that a particular answer is not a satisfactory answer to a particular query, in which case that particular answer may be deemed an unreliable answer to that particular query. Alternatively, whether a particular answer is a satisfactory answer to a particular query may be assessed using any of the other methods discussed above, such as using a machine learning classifier or using human or rule-based annotation of answers or any combination of these methods. If the particular answer is determined to be unsatisfactory, the answer may also be considered to be unreliable.

The rephrased version of the query obtained at item 120 of FIG. 2 may be received, or otherwise obtained, in various different ways. Examples are given with reference to FIGS. 6 to 8 (discussed further below), although other examples are possible. For example, where the query is represented by first text data, the first text data may be sent to a paraphrasing system, which may be considered to correspond to an NLU subsystem of the NLU system. The paraphrasing system of the NLU system may be different from another NLU subsystem, which may be used to determine that the intent of the user is to ask a query. The paraphrasing system may include second text data representative of a previously answered query by the query-answering system. It may then be determined, using the first text data and the second text data (and as described further below), that the previously answered query is a rephrased version of the query.

The rephrased version of the query may be represented by what is referred to herein as paraphrase data. The paraphrase data may be in any suitable data format. In examples, a data format of the query, is the same, or substantially the same, as a data format of the paraphrase data. For example, where the query is in the form of first text data, the rephrased version of the query may be represented by the second text data. A data format, sometimes referred to as a format, type or data type, is for example a classification of data, which for example indicates to a compiler or interpreter how data of a particular format is to be used. Common data types include integers, Booleans, characters, floating-point numbers (sometimes referred to as floats) and strings. In other examples, a data format may be considered to correspond to a file format, which typically refers to a standardized way (which may be proprietary or open-source) of encoding data for storage in a computer file, or a data storage format such as a particular structure such as a database or table. Two data formats may be considered substantially the same where they may be used to represent the same category of data, such as numerical data or textual data. For example, a character and a string may each be used to represent text and may therefore be considered to be of substantially the same data format.

At item 122 of FIG. 2, the rephrased version of the query is sent to the query-answering system, for example to each of at least one of a plurality of query-answering subsystems of the query-answering system (such as to a first and a second query-answering subsystem). In this way, the query-answering system may have another attempt to answer the query (rephrased as the rephrased version of the query). For example, the rephrased version of the query may be processed by the same query-answering subsystems of the query-answering system as those used to initially process the query, in examples in which the query-answering system includes a plurality of query-answering subsystems.

At item 124 of FIG. 2, it is determined whether the query-answering system has a satisfactory answer to the rephrased version of the query. This determination may be similar to the determination of item 116 of whether the query-answering system has a satisfactory answer to the query. In other examples, though, the determination at item 124 of FIG. 2 may include other processes, which may include determining whether the rephrased version of the query satisfactorily captures the meaning of the query in addition to determining whether the answer to the rephrased version of the query is a satisfactory answer. In yet further examples, the determination at item 124 of FIG. 2 may be omitted.

If it is determined that the query-answering system has a satisfactory answer to the rephrased version of the query, the answer to the rephrased version of the query is returned at item 126 of FIG. 2. For example, the answer may be received from at least one of the plurality of query-answering subsystems of the query-answering system, such as from the first query-answering subsystem. The answer may be represented by answer data, which may be in any suitable format. For example, the answer data may be in the form of answer text data. The answer data may be converted to a different format before being sent to a user. For example, audio data may be generated using text to speech processing and the answer text data before being returned to the user as an audio output. The answer may undergo further processing before being sent to a user. For example, where the answer is in the form of answer text data, third text data may be generated, which may then be used to generate the audio data, using text to speech processing. The third text data may be representative of text including a first sequence of words representative of the rephrased version of the query and a second sequence of words representative of the answer to the rephrased version of the query. In this way, both the rephrased version of the query and the answer itself may be returned to the user, allowing the user insight into how the answer was obtained. A sequence of words is for example a consecutive series of words, which together form a phrase or clause. The text may also include other words, such as initial words or adjoining words to explain to the user what is being returned or to make the text grammatically or syntactically correct.

In other examples, an output returned to the user (for example based on the answer data) may be augmented with other forms of data. For example, visual data may be generated and returned to the user via a device including or coupled to a screen. Such visual data may be generated from processing of the second text data, the answer text data or the third text data. Visual data may allow the user insight into how the answer was obtained or what entities are mentioned in it. For example, the visual data may represent a graphical output (which may include images or text) providing this insight to the user. Graphical output, which may be referred to as visual output, may be displayed to the user via a graphical user interface (GUI) displayed on a display screen.

Conversely, if it is determined that the query-answering system lacks a satisfactory answer to the rephrased version of the query, the method of FIG. 2 involves sending an indication that no satisfactory answer is available. This indication may be sent to the user, for example in the form of a standard message, which may be expressed in a variety of formats such as text or audio data, indicating that the query-answering system has been unable to answer the query. Alternatively, the indication may be sent to other components of a system for processing queries, which may perform other actions in response to this indication.

If an answer is provided to the user (either at item 118, as an answer to the original query, or at item 126, as an answer to the rephrased version of the query), the method of FIG. 2 involves seeking feedback on the answer, at item 130.

Figure 3:
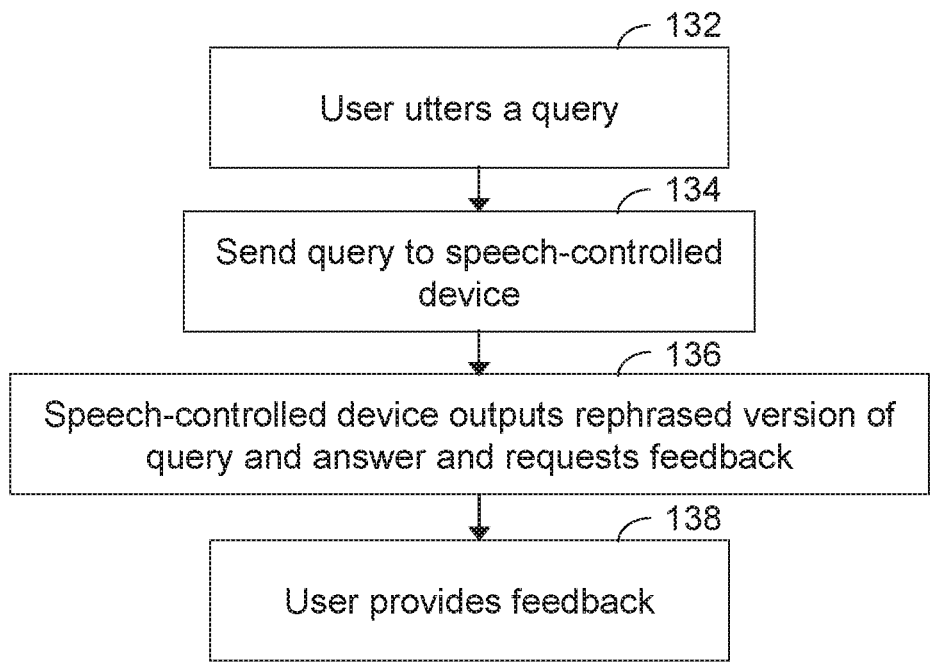
FIG. 3 is a flow diagram showing features of a method of rephrasing a query according to examples.

An example of seeking feedback is shown in more detail in FIG. 3. At item 132 of FIG. 3, the user utters a query. The query is submitted to a speech-controlled device at item 134 of FIG. 3. The speech-controlled device for example sends audio data representative of the query to a speech processing system, such as the speech processing system 108 of FIG. 1, which performs the method of FIG. 2 to generate an answer to a rephrased version of the query.

At item 136 of FIG. 3, the speech-controlled device outputs audio data. The audio data in this case includes the rephrased version of the query and the answer to the rephrased version of the query, for example as shown in FIG. 1. The speech-controlled device in the example of FIG. 3 also requests feedback from the user, via the audio data. Feedback regarding various aspects of the response to the query may be sought. For example, feedback regarding whether the answer is a satisfactory answer to the original query may be sought, or feedback regarding whether the rephrased version of the query satisfactorily captures a meaning of the query may be sought.

The speech-controlled device may seek feedback in a variety of different formats. For example, the speech-controlled device may request narrative feedback, in which the user may respond with free text or speech, without being restricted to a limited range of responses. Alternatively, the speech-controlled device may request feedback expressed as one of a limited range of options. For example, the user may be asked to indicate on a binary scale whether their feedback is positive feedback or negative feedback, or on a limited numerical scale, such as a scale from 1 to 5, how positive their feedback is. For example, the user may be asked to provide a binary reward signal indicating whether the answer returned to them in response to their query is correct or incorrect. The user may also input their feedback in various different ways. For example, the user may provide input as text, as speech, via a user interface such as a screen associated with or coupled to the speech-controlled device or via tactile feedback (such as by pressing one button of the speech-controlled device to provide positive feedback and a different button of the speech-controlled device to provide negative feedback). The user provides feedback at item 138 of FIG. 3.

In the example of FIG. 3, the speech-controlled device requests feedback at item 136. However, in other cases, the user may provide feedback in implicit ways, which may not be prompted by a request for feedback from the speech-controlled device. For example, the user may interrupt an audio answer, which may be interpreted as an indication that the answer is incorrect. The user may respond to an answer conversationally with speech which may be interpreted as feedback (such as "Nice answer!"). In some cases, the user may ask a subsequent query including speech or text rephrasing the query, which may be interpreted as feedback. For example, the user may restate the query, which may be prefaced by an indication that the query is being rephrased, such as "I asked you . . . " or "Let me ask you something easier . . . ". Alternatively, the user may simply repeat exactly the same query or a query which can be recognized as sufficiently similar to be an attempt to gain an answer to a previously unanswered query.

The speech-controlled device may request feedback for a subset of answers provided to users, rather than for every answer. This may improve the user experience, by allowing them to provide feedback to improve the speech processing system, without overwhelming the user with requests for feedback, which may interfere with their use of the speech-controlled device. The subset of answers for which feedback is sought may be random or may be selected to elicit information about answers, types of answers or query-answer pairs for which sufficient feedback has not yet been elicited. This selection may be based on features of the query, the answer, the confidence or relevance that the system has in the answer or the query-answer pair, and past feedback. For example, an active learning framework could be used to prioritize requests for feedback where the system (for example an answer ranker of the system, as discussed further below) is unsure of an answer's quality.

It is to be appreciated that FIG. 3 is merely one example in which feedback may be sought. The principles behind FIG. 3 may equally be applied to other systems, such as text-based systems without a speech-controlled device. In such cases, the user may provide the query in the form of text and the request for feedback, and the feedback itself, may also be in the form of text.

Figure 4:
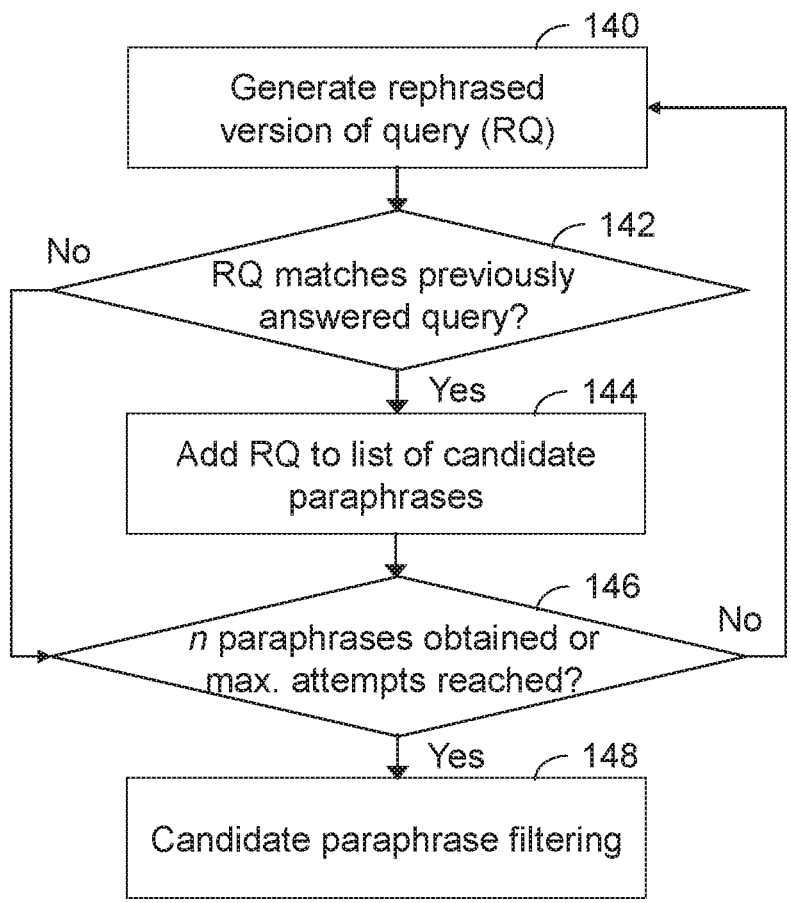
FIG. 4 is a flow diagram showing a method of obtaining a rephrased version of a query according to examples.

FIG. 4 is a flow diagram showing a method of receiving, or otherwise obtaining, a rephrased version of a query according to examples.

At item 140 of FIG. 4, a rephrased version of a query is generated. Various different methods may be used to generate the rephrase version of the query, as described further below with reference to FIGS. 6 to 8.

At item 142 of FIG. 4, it is determined whether the rephrased version of the query matches a previously answered query, answered previously by the query-answering system, for example by at least one of a plurality of query-answering subsystems of the query-answering system, such as at least one of the first or second query-answering subsystems. For example, a data structure such as a database may store a plurality of previously answered queries answered by the query-answering system.

In such cases, determining whether the rephrased version of the query matches a previously answered query may include querying the data structure to determine whether text of the rephrased version of the query is the same as text of one of the previously answered queries. An exact match may be sought, for example using string matching techniques. Alternatively, the rephrased version of the query may be considered to match a previously answered query if there is at least a partial match between the rephrased version of the query and the previously answered query (although this may reduce the likelihood of the query-answering system including an answer to the rephrased version of the query).

If the rephrased version of the query matches or otherwise corresponds to a previously answered query, the rephrased version of the query is added to a list of candidate paraphrases at item 144. The candidate paraphrases may be stored in any suitable data format, such as data formats which may be stored and/or accessed efficiently. Indeed, although in FIG. 4 the candidate paraphrases are stored as a list, for example within a data structure such as a database, in other examples the candidate paraphrases may be stored in a different data format.

Hence, methods such as FIG. 4 may be considered to involve identifying a previously answered query answered by the query-answering system before receiving the paraphrase data (representative of the rephrased version of the query), and using the previously answered query as the rephrased version of the query. Although the method of FIG. 4 includes further items (such as items 144, 146 and 148), it is to be appreciated that using a previously answered query as a rephrased version of the query may be used in other examples which do not include (or include a subset of) these items of FIG. 4.

If the rephrased version of the query does not match any of the previously answered queries stored in the data structure, or after adding the rephrased version of the query to the list of candidate paraphrases at item 144, the method of FIG. 4 involves determining whether n candidate paraphrases have been obtained, or whether a maximum number of attempts have been made, at item 146. If not, the method reverts to item 140 in order to generate additional candidate paraphrases. In this way, the method of FIG. 4 can be used to obtain a plurality of candidate paraphrases. This may increase the likelihood of one of the candidate paraphrases satisfactorily capturing the meaning of the query compared with examples in which solely one rephrased version of the query is obtained. The number of candidate paraphrases obtained, n in FIG. 4, may be selected based on various factors including an acceptable latency for returning answers to users (as increasing the number of candidate paraphrases may increase the time taken to obtain an answer for providing to a user). Other factors for selecting n may include available processing capability of a system for implementing the method of FIG. 4 as well as or instead of available storage space for storing candidate paraphrases. Furthermore, n may depend on a desired or target accuracy of the system, compared with a target response time. Increasing n may increase the accuracy of the answer provided to the user (by allowing more accurate paraphrases to be generated), at the expense of a slower response time. Hence, n may be selected to adequately balance the accuracy with the response time. The maximum number of attempts may also be selected based on a desired response time. For example, the maximum number of attempts may correspond with a predetermined maximum number of rephrased versions of the query to be generated, which may depend on the desired response time (as typically generating additional rephrased versions of the query increases the response time).

After obtaining n candidate paraphrases or after the maximum number of attempts has been reached, the method of FIG. 4 involves, at item 148, filtering of the candidate paraphrases. Filtering such as this may be used to identify one of the candidate paraphrases as a most appropriate paraphrase or other type of rephrased version of the query, such as a rephrased version of the query which most accurately captures a meaning of the query. For example, filtering may include removing candidate paraphrases which are deemed to be dissimilar from the query or which are not considered to satisfactorily capture the meaning of the query. Filtering may also or instead involve arranging or otherwise ranking the candidate paraphrases in order of how accurately the candidate paraphrases capture the meaning of the query or in order of how relevant answers to the candidate paraphrases are to the original query. In this way, an appropriate candidate paraphrase can be identified.

Figure 5:
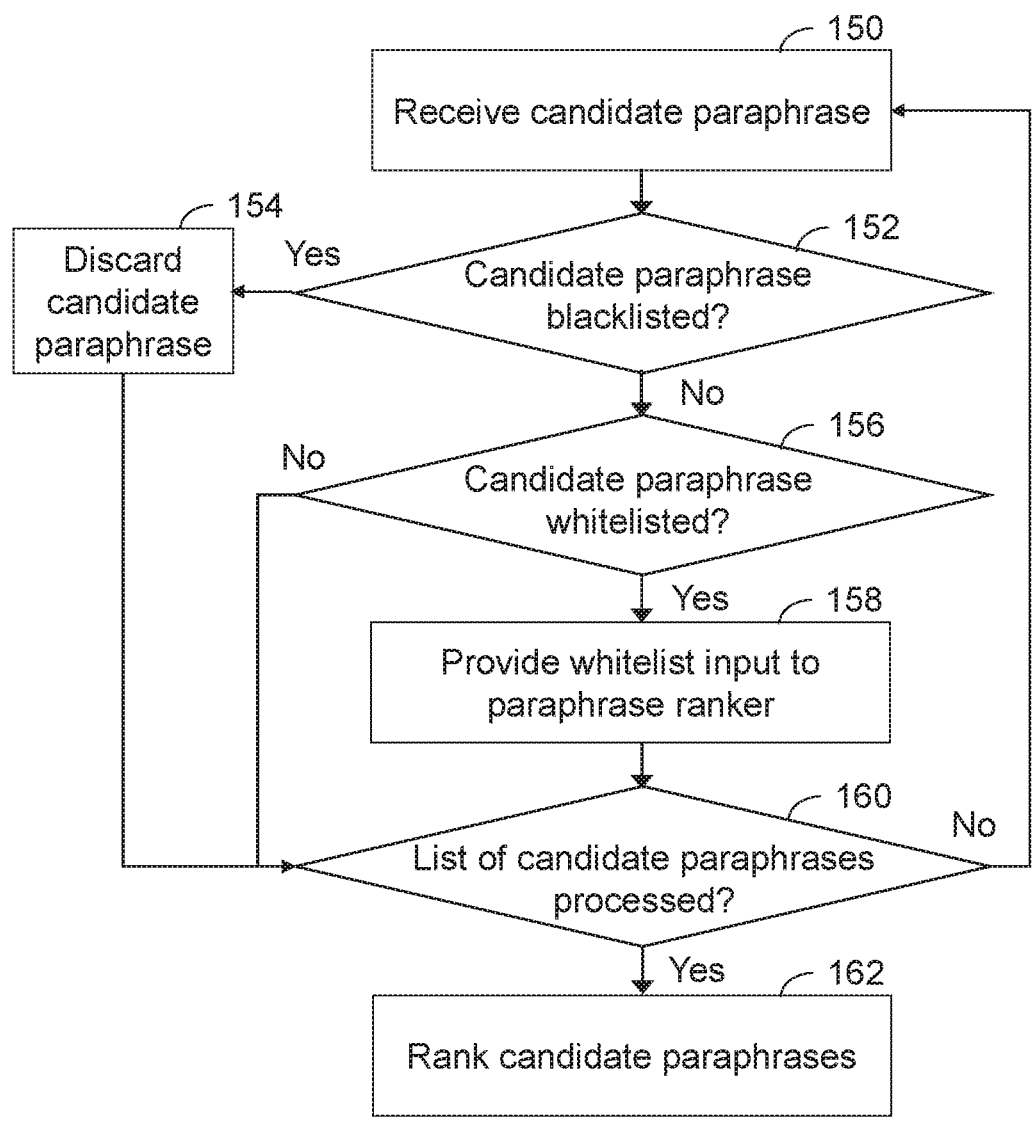
FIG. 5 is a flow diagram showing features of a method of obtaining a rephrased version of a query according to examples.

An example of filtering is shown in FIG. 5. At item 150 of FIG. 5 a rephrased version of a query is received. The candidate rephrased version of the query may be obtained using any suitable method, such as the methods of FIGS. 6 to 8 described herein. For example, a previously answered query may be associated with the query as a candidate of the query, as described with reference to FIG. 4.

At item 152, a determination as to whether the candidate paraphrase is blacklisted is made. This determination may be made for example by analyzing the candidate paraphrase, for example by comparing the candidate paraphrase with a blacklisted paraphrase of the query, to determine whether the candidate paraphrase matches or differs from the blacklisted paraphrase. If the candidate paraphrase matches the blacklisted paraphrase, the candidate paraphrase may be considered to be blacklisted, and may be discarded. Conversely, if the candidate paraphrase differs from the blacklisted, the candidate paraphrase may be retained as a candidate paraphrase.

A blacklisted paraphrase is for example a paraphrase or other type of rephrased version of the query which has previously been determined not to satisfactorily capture a meaning of the query. An example of generating a blacklist including a blacklisted paraphrase is described with reference to FIG. 10. The blacklist may be stored in any suitable data format. For example, the blacklist may be stored as a first data structure comprising first data representative of at least one unsatisfactory paraphrase of the query. For example, the first data structure may be a first database. Entries of the first database may correspond with respective unsatisfactory paraphrases of the query. These unsatisfactory paraphrases may for example be stored in the form of text, which may be compared against a textual representation of the candidate paraphrase, for example using string matching, to determine whether the candidate paraphrase matches any of the unsatisfactory paraphrases or not.

If it is determined that the candidate paraphrase is blacklisted, for example by determining that a first data structure including first data representative of at least one unsatisfactory paraphrase of the query includes the first paraphrase data, the method of FIG. 4 includes discarding the candidate paraphrase at item 154. If, however, the candidate paraphrase is not blacklisted, the method of FIG. 4 continues to determine whether the candidate paraphrase is whitelisted, at item 156. For example, item 156 may include comparing the candidate paraphrase with a whitelisted paraphrase of the query and determining whether the candidate paraphrase matches the whitelisted paraphrase.

A whitelisted paraphrase is for example a paraphrase or other type of rephrased version of the query which has previously been determined to satisfactorily capture a meaning of the query. An example of generating a whitelist including a whitelisted paraphrase is described with reference to FIG. 10. As for the blacklist, the whitelist may be stored in any suitable format. For example, the whitelist may be stored as a second data structure comprising second data representative of at least one satisfactory paraphrase of the query. The second data structure may have the same structure as or a different structure from the first data structure. For example, the second data structure may be a second database. Entries of the second database may correspond with respective satisfactory paraphrases of the query. As for the unsatisfactory paraphrases of the first data structure, these satisfactory paraphrases may for example be stored in the form of text, which may be compared against a textual representation of the candidate paraphrase, for example using string matching, to determine whether the candidate paraphrase matches any of the satisfactory paraphrases or not. In some cases, there may be a data structure which stores both the blacklist and the whitelist. For example, a database may store both blacklisted and whitelisted paraphrases, with each entry (corresponding to a particular paraphrase) associated with a flag indicating whether that particular paraphrase is blacklisted or whitelisted.

At item 158 input is provided from the determination at item 156 of whether the candidate paraphrase is whitelisted, to a paraphrase ranker (item 162 of FIG. 5). On this basis, methods such as FIG. 5 may determine whether a candidate paraphrase (which for example corresponds with a previously answered query) is a rephrased version of the query. For example, it may be determined that a candidate paraphrase which matches a whitelisted paraphrase is a rephrased version of the query. Similarly, if a candidate paraphrase differs from the blacklisted paraphrase, it may be determined that the candidate paraphrase is a rephrased version of the query. Hence, a blacklist and a whitelist such as those of FIG. 5 may be used independently of each other. A candidate paraphrase may therefore be checked against either or both of a blacklist and a whitelist.

In some examples, a comparison of a candidate query against a blacklist and/or a whitelist may indicate that the candidate query does not satisfactorily capture a meaning of the query. In such cases, at least one further candidate query may be obtained and compared against the blacklist and/or the whitelist. As an example, if first paraphrase data representative of a first rephrased version of the query is used as a first candidate paraphrase, and it is determined that the first data structure including the first data representative of the at least one unsatisfactory paraphrase of the query includes the first paraphrase data, a second candidate paraphrase may be received or otherwise obtained. For example, second paraphrase data representative of a second rephrased version of the query, different from the first rephrased version of the query, may be used as a second candidate paraphrase. In such cases, if it is determined that the first data structure, which is for example a blacklist, lacks the second paraphrase data, the second paraphrase data may be used as the paraphrase data. Hence, the second paraphrase data may be used as the rephrased version of the query, and an answer to this rephrased version of the query may be returned to a user.

A similar process may be performed using a whitelist. For example, first paraphrase data representative of a first rephrased version of the query may be used as a first candidate paraphrase. If it is determined that the second data structure including the second data representative of the at least one satisfactory paraphrase of the query lacks the second paraphrase data, a second candidate paraphrase may be received or otherwise obtained. For example, second paraphrase data representative of a second rephrased version of the query, different from the first rephrased version of the query, may be used as a second candidate paraphrase. In such cases, if it is determined that the second data structure, which is for example a whitelist, includes the second paraphrase data, the second paraphrase data may be used as the paraphrase data. Hence, the second paraphrase data may be used as the rephrased version of the query, and an answer to this rephrased version of the query may be returned to a user.

A blacklist and a whitelist may be used in conjunction with each other or independently. For example, a candidate paraphrase may be retained provided it is not included in the blacklist, without checking whether it is included in the whitelist. Conversely, a candidate paraphrase may be retained if it is included in the whitelist, without checking whether it is included in the blacklist. In other words, in some cases it may not be necessary to check both the blacklist and the whitelist. This may improve the efficiency of identifying candidate paraphrases.

While the example of FIG. 5 involves determining whether a candidate paraphrase is included in a blacklist and/or a whitelist, other examples may include determining a statistical likelihood or degree of match between a candidate paraphrase and blacklisted paraphrases and/or whitelisted paraphrases.

Determination of whether a candidate paraphrase is included in a blacklist and/or a whitelist may be based on an answer associated with the candidate paraphrase. For example, where the candidate paraphrase is a previously answered query, examples may include receiving or otherwise obtaining the answer to the previously answered query, as received from the query-answering system. In such cases, the assessment of whether a candidate paraphrase is blacklisted or whitelisted may include an answer filter process, in which a candidate pair of a candidate paraphrase and an answer associated with the candidate paraphrase may be blacklisted or whitelisted depending on a quality of the answer. For example, a Bloom filter based mechanism may be used to determine whether a candidate pair of a candidate paraphrase and an answer associated with the candidate paraphrase is to be blacklisted. A Bloom filter may be considered to be a probabilistic data structure, which may be used to ascertain whether an element (such as a candidate pair) is a member of a set (such as a set of satisfactory candidate paraphrases). A Bloom filter may be used to provide an indication that a candidate pair either is possibly in the set of satisfactory candidate paraphrases or is not in the set of satisfactory candidate paraphrases. If the Bloom filter indicates that the candidate pair is not in the set of satisfactory candidate paraphrases, the candidate paraphrase may be discarded, as at item 154 of FIG. 5.

Referring back to FIG. 5, the input provided to the paraphrase ranker at item 158 may be a binary indication of whether the candidate paraphrase is or is not whitelisted, such as a flag or numerical indication (such as a 0 or 1). In other cases, the input provided to the paraphrase ranker at item 158 may instead represent a statistical value of how similar the candidate paraphrase is to a closest matching whitelisted paraphrase and hence, a statistical likelihood that the candidate paraphrase is or corresponds to this whitelisted paraphrase.

At item 160 of FIG. 5, it is determined whether a list of candidate paraphrases, such as a list of n different paraphrases, has been processed. If not, the method of FIG. 5 reverts to item 150 to process one of the n paraphrases which has not yet been processed. Otherwise, the method of FIG. 5 continues to item 162, in which the candidate paraphrases are ranked. As will be appreciated, FIG. 5 is merely an example and other methods of filtering candidate paraphrases are possible. For example, rather than generating a plurality of candidate paraphrases initially, and then sequentially processing each of the candidate paraphrases using the method of FIG. 5, other methods may instead involve generating one candidate paraphrase and only generating further candidate paraphrases if the initial candidate paraphrase is blacklisted or is not whitelisted.

In the example of FIG. 5, the candidate paraphrases are ranked at item 162. The ranking of the candidate paraphrases may be based on the degree or other extent to which each candidate paraphrase captures the meaning of the original query. However, in other cases the candidate paraphrases are ranked based on the relevance of an answer associated with the respective candidate paraphrase to the original query. For example, if a candidate pair (of a candidate paraphrase, which may for example correspond with a previously answered query, and an answer to the candidate paraphrase) is deemed to be a relatively high quality query-answer pair, the candidate may be ranked higher than another candidate pair, which is identified as being a lower quality query-answer pair. This approach to ranking candidate paraphrases may be referred to as answer ranking. Various different answer ranking systems may be used to perform answer ranking. For example, a hybrid rule and statistical model based ranking system may be used to rank candidate pairs according to the relevance of these candidate pairs to the original query. For example, an answer ranking system may be arranged to determine a confidence that an answer (for example associated with a particular candidate pair) is of high quality, or is likely to accurately answer the original query. The answer ranking system may use a supervised machine learning classifier trained on feedback or annotations of query-answer pairs, such as a bi-LSTM (bidirectional long short-term memory) neural network operating over the query and answer in a numerical format, with a softmax layer to output a relevance or other confidence in the query-answer pair.

In such examples, first paraphrase data representative of a first rephrased version of the query may be obtained and first answer data representative of a first answer to the first rephrased version of the query may be obtained from the query-answering system. In addition, second paraphrase data representative of a second rephrased version of the query may be obtained and second answer data representative of a second answer to the second rephrased version of the query may be obtained from the query-answering system. A first relevance of the first answer to the query may be determined, and a second relevance of the second answer to the query may also be determined. If it is determined that the second relevance is less than the first relevance, output data, which may represent an answer to be returned to a user, may be generated based on the first answer data. In other words, the first answer may be identified as more appropriately answering the original query than the second answer.

The quality of a question-answer pair (such as that of a particular candidate pair) may also depend on the method used to obtain the answer. For example, in some cases the query-answering system may include different query-answering subsystems. Some of these query-answering subsystems may be of a higher quality than others. For example, the query-answering system may include a first query-answering subsystem with a first precision and a second query-answering subsystem with a second precision. A precision of a query-answering subsystem may represent how accurately or reliably the query-answering subsystem is able to answer queries. For example, a precision of a query-answering subsystem may be determined by calculating a proportion of successful answers (such as answers that users have provided positive feedback for) compared to all answers. Examples of different query-answering subsystems are discussed further below with reference to FIG. 13.

In examples such as this, a first previously answered query and a second previously answered query may be obtained. It may be determined that the first previously answered query was answered by the first query-answering subsystem and that the second previously answered query was answered by the second query-answering subsystem. If it is determined that the second precision of the second query-answering subsystem is less than a first precision of the first query-answering subsystem, the first previously answered query may be used as the rephrased version of the query. In other words, the first previously answered query may be ranked higher than the second previously answered query. Such a process may be extended to a greater number of previously answered query than two, and further ranking or other sorting of the previously answered queries may be performed, for example based on a confidence that an answer to each of the previously answered queries satisfactorily answers the original query.

Although FIG. 5 relates to filtering and ranking candidate paraphrases, similar methods to FIG. 5 may be performed to filter and/or rank answers to a rephrased version of a query, which does not necessarily correspond with a previously answered query, or to answers to queries which have not been rephrased. For example, if at item 116 of FIG. 2, it is determined that the query-answering system has an answer to a query, the answer to the query may be compared against a blacklist as in item 152 of FIG. 5 and/or against a whitelist as in item 156 of FIG. 5.

Similarly, if the query-answering system returns a plurality of answers to a query, these answers may undergo comparison against a blacklist and/or a whitelist and, additionally or alternatively, may be ranked using an answer ranker In such cases, the answer which is ranked highest according to the answer ranker may be returned as the satisfactory answer to the query (as at item 118 of FIG. 2). Alternatively, a decision as to which answer to return, for example in cases where two answers are similarly ranked but feedback about one is lacking, may be influenced based on a desire to gather more feedback about one of the answers. Such a decision may be implemented using a machine learning model such as a contextual multi-armed bandit, in which a limited set of resources is allocated between alternative choices (such as which answer to return) in a way to maximize an expected gain. This for example involves what may be referred to as an "explore-exploit" tradeoff. For example, a first answer may have a slightly higher ranking than a second answer, but the second answer may have less feedback than first answer. Hence, there is a tradeoff between "exploitation" of the first answer and "exploration" of the second answer, to get more information about the second answer (in the form of feedback). This further feedback may be used to adapt the answer ranker, which may over time rank the second answer as more satisfactory than the first answer (after receiving more feedback on the second answer), or may more confidently rank the second answer as less satisfactory than the first answer. In this way, the information available for future decisions, e.g. in the form of feedback that may be received in response to the answer returned to the user, may be expanded.

Example methods of obtaining rephrased versions of a query will now be described with reference to FIGS. 6 to 8. The methods may for example be performed by processing a representation of the query obtained from an NLU subsystem of an NLU system.

Figure 6:
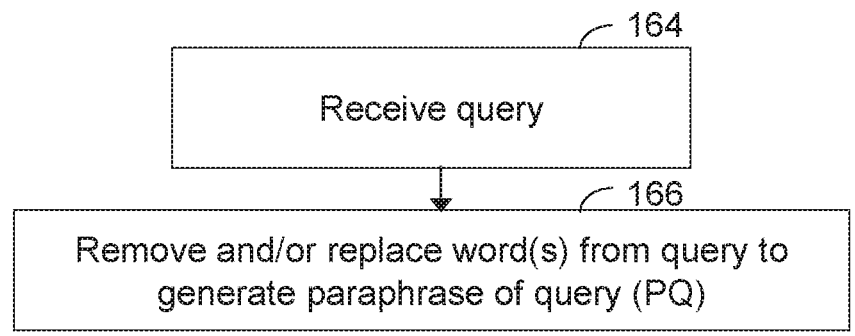
FIG. 6 is a flow diagram showing an example method of rephrasing a query according to examples.

At item 164 of FIG. 6 a query is received. At item 166 of FIG. 6, the query is transformed by at least one of: removing or replacing at least one word of the query to generate the rephrased version of the query. For example, the method of FIG. 6 may be used to transform a query into a different version of the query. Words of the query may be removed for example using stop word removal techniques. Typically, stop words are considered to be common words, such as "a", "or", "and" and "but". Various techniques may be used to remove stop words, such as term frequency-inverse document frequency (TF-IDF) techniques. TF-IDF typically represents a value that aims to represents the importance of a term (which is for example a word) to a document in a collection of documents. The collection of documents may be external to the query-answering system or may include previous queries submitted to the query-answering system. For example, the collection of documents may be a collection of all previous queries submitted to or answered by the query-answering system. Alternatively, the collection of documents may be a corpus of all previous non-answered queries that the query-answering system lacked an answer to or lacked a satisfactory answer to. In this context, TF-IDF techniques may be used to derive a value that represents the importance of words of the text data to the text data. Data representative of words that are determined to be less important, such as beneath a predetermined threshold, may be removed from the text data.

In other examples in accordance with FIG. 6, a syntactic parser may be used to transform words of the query to other words, such as synonymous words, or to identify words which may be removed. Such a syntactic parser may therefore syntactically transform the query to generate the rephrased version of the query. In other examples, rules defined over the words or syntactic parse may be used to define a transformation to be applied to the query, for example as a finite state transform (FST). In yet further examples, machine learning models, such as a conditional random field (CRF), semi-CRF or sequence-to-sequence model, may be trained to transform or remove words from a query.

Rephrased versions of a query obtained as set out in FIG. 6 may be used with any of the other methods described herein. For example, rephrased version of a query may be obtained using the method of FIG. 6 and then compared against previously answered queries to identify a previously answered query which corresponds with the rephrased version of the query. In such cases, the identification of an appropriate previously answered query may be verified using a Bloom filter to determine inappropriate rephrasings which do not adequately correspond with a previously answered query.

Figure 7:
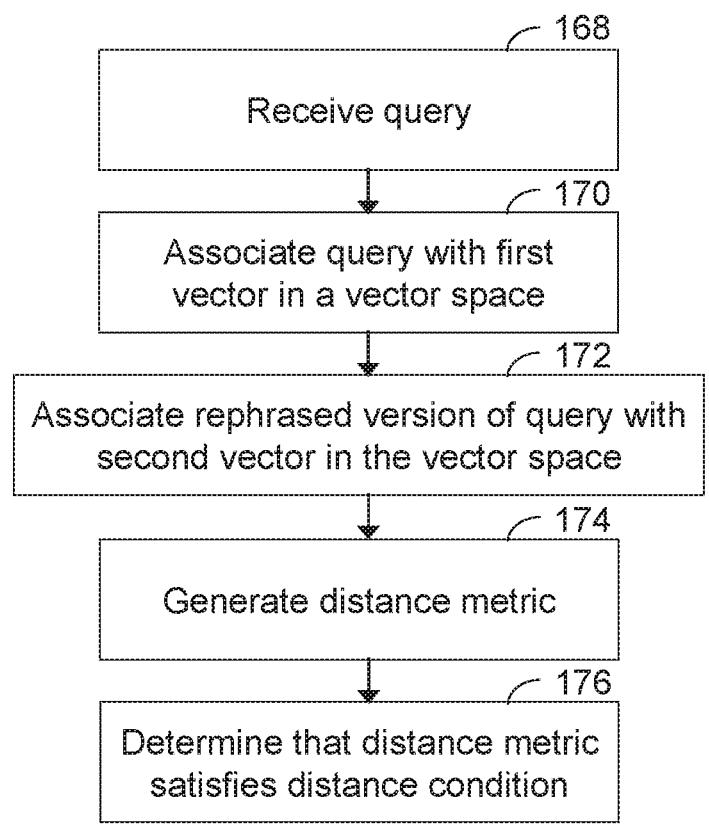
FIG. 7 is a flow diagram showing an example method of rephrasing a query according to further examples.

FIG. 7 is a flow diagram illustrating an alternative method of obtaining a rephrased version of a query. The method of FIG. 7 may be referred to as a nearest neighbor paraphraser. At item 168 of FIG. 7, a query is received. The query is associated with a first vector in a vector space at item 170 of FIG. 7. A vector typically includes a plurality of elements, which each correspond to a different dimension. For example, a three-dimensional vector includes three elements, each of which correspond to a different dimension (such as x, y, z in 3-dimensional Euclidean space). For a given vector space, the magnitude of each element of a vector may therefore be considered to correspond to a position in that particular dimension, with respect to a coordinate system associated with the vector space. For example, in 3-dimensional Euclidean space, the vector (2, 3, 4) may be considered to correspond to the location x=2, y=3 and z=4, as expressed in a Cartesian coordinate system. The vector space of the first vector is for example a semantically meaningful vector space, in which locations (which may be referred to as positions) which are close together represent similar concepts or meanings whereas locations which are far apart represent different concepts or meanings. The vector space may have a large number of dimensions rather than merely three. For example, text may be represented by a vector in a sparse manner. With a sparse representation, each different word or query may be represented by a vector with one non-zero entry in a different respective position, with all other entries of the vector equal to zero. As will be appreciated, if it is desired to use such a vector for representing any of n different words, the vector must also be n-dimensional. Given the large number of words (and hence of different queries that a user may ask), in other cases, text (such as text of a query) may instead be represented using a dense representation, using a vector with m dimensions, where m is less than the number of words, n, to be represented. In some cases, a query may be associated with the first vector by identifying a respective vector associated with each of the words of the query, and subsequently combining each of these vectors (for example by concatenating these vectors). This association may be performed using any suitable process, such as a word embedding process. There are various different word embedding processes that may be used, as the skilled person will appreciate, including those based on a continuous bag of words model or a skip-gram model. For example, if the query is in the form of first text represented by the first text data, a word embedding process may be used to associate the first text data with the first vector. A machine learning model may be used to perform this association, for example to perform the word embedding process. For example, a Siamese neural network may be trained to associate similar words to similar vectors in the vector space.

At item 172 of FIG. 7 the rephrased version of the query is associated with a second vector in the vector space. The rephrased version of the query may be associated using the same process as that used to obtain the first vector at item 170. For example, the same word embedding process, such as the same trained Siamese neural network, may be used to obtain the second vector. Where the rephrased version of the query is in the form of second text, represented by the second text data, the word embedding process may be used to associate the second text data with the second vector.

At item 174 of FIG. 7 a distance metric representative of a similarity between the rephrased version of the query (which may be a previously answered query) and the query is generated. The distance metric may be generated by calculating a separation between a first position in the vector space and a second position in the vector space. The first position is for example represented by the first vector and the second position is for example represented by the second vector. In this way, a distance between the first and second vectors may be calculated in the vector space, which may be taken as the distance metric. Various different methods may be used to calculate such a separation (which is for example distance). For example, the separation may be calculated by calculating any distance such as a Euclidean distance or a cosine distance (sometimes referred to as a cosine similarity).

Although the example of FIG. 7 involves calculating a distance between vector representations of the query and the rephrased version of the query, in other examples a distance may instead be calculated based on other representations of the query and the rephrased version of the query. For example, a Levenshtein distance may be calculated from string representations of the query and the rephrased version of the query. The Levenshtein distance for example represents a minimum number of single-character changes to change one word (or phrase) to another.

In this way, a distance metric may be obtained, which either represents one of these distances, or a combination of a plurality of distances calculated using different methods. Where the distance metric represents a combination of a plurality of distances, such a combination may be performed in various different ways, such as a sum or an average.

At item 176 of FIG. 7 it is determined that the distance metric satisfies a distance condition. The distance condition may be satisfied where the second vector is the nearest neighbor to the first vector in the vector space. For example, a vector may be calculated for each of a plurality of previously answered queries in the vector space, to obtain a plurality of vectors that include the second vector. If the second vector is the closest of the plurality of vectors to the first vector, for example if the separation between the first and second vectors is smaller than the separation between the first vector and any of the other vectors of the plurality of vectors, the distance condition may be considered to be satisfied. In such cases, the previously answered query represented by the second vector may be considered to be the closest match of the plurality of previously answered queries to the query, and may therefore most accurately capture a meaning of the query. In response, the previously answered query may therefore be used as the rephrased version of the query.

The distance condition may be different in other examples, though. For example, the distance condition may be satisfied where the distance or the distance metric is less than or equal to a threshold distance. This may be the case where the separation between the first and second positions in the vector space is less than or equal to a threshold separation. The threshold distance (which may correspond to a threshold separation) may depend on available system resources and a desired accuracy of the system. For example, if a highly accurate rephrasing is desired, the threshold distance may be smaller (implying a closer match between the rephrased version of the query and the query). However, this may be less efficient or use more system resources. In contrast, if a lower accuracy is tolerable or the system resources available are limited, the threshold distance may be higher (implying that larger differences between the rephrased version of the query and the query are tolerable).

Figure 8:
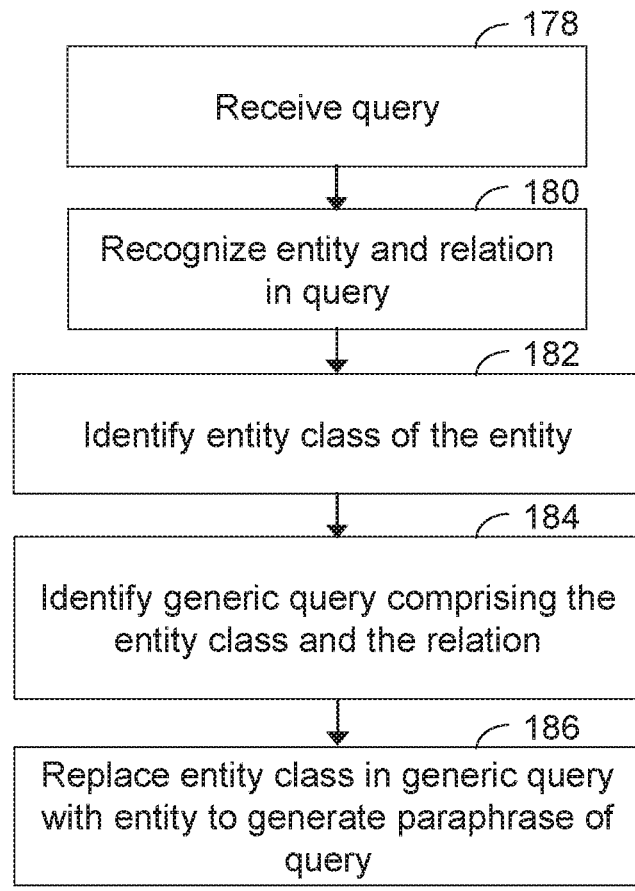
FIG. 8 is a flow diagram showing an example method of rephrasing a query according to yet further examples.

FIG. 8 provides a further example of receiving or otherwise obtaining a rephrased version of a query. The example of FIG. 8 may be referred to as a so-called shallow-parse-exemplar mapper. At item 178 of FIG. 8 a query is received. At item 180 of FIG. 8 the query is processed to recognize an entity in the query and a relation in the query. A semantic parser may be used to perform this item of FIG. 8. For example, a semantic parser may compute a shallow parse of the query. Shallow parsing for example involves identification of constituent parts of a phrase such as nouns, verbs and adjectives, and then identifying more complex components that for example reflect semantic relations between the constituent parts. In this way, entities and relations present in the query may be identified. Entities are for example a concept or object, and may include named entities, which are for example real-world concepts or objects (which may be abstract or exist physically) that can be denoted with a proper noun. Relations for example represent relationships or facts relating to entities. A semantic parser (or other machine learning model for identifying entities and relations in a query) may be implemented as a combination of an entity tagger, to identify entities in the query, and an intent classifier, to identify the interactions or relationships between the identified entities. An entity tagger may for example use a linear chain conditional random field (CRF) or a recurrent neural network. An intent classifier may be a feedforward neural network.

At item 182 of FIG. 8, an entity class of an entity of the query is identified. This may for example be based on the entities identified in the query. For example, if the semantic parser is a machine learning model which is trained to identify a plurality of different entities, each of these different entities may grouped into respective groups, which for example correspond with entity classes. As an example, if it is determined that the query "What is the capital city of France?" includes the entity France, it may be determined that the entity France belongs to the entity class country on the basis that the entity France has been pre-associated with the entity class country. An entity class for example represents a group of entities that each have features in common, based on what each of the entities actually is at a conceptual level.

At item 184 of FIG. 8, a generic query comprising the entity class and the relation is identified. The generic query may be considered to be an exemplar query, which for example represents a generalized version of a query. For example, an exemplar query may include entity classes and relations rather than specific entities and relations. As an example, the query "Please tell me what is the capital city of France?" may be generalized to "Please tell me what is the capital city of country?". However, the generic query may be exactly the same as generalized version of a particular query.

In general, a generic query may be the most simple way of asking a particular question. For example, a generic query which represents the query "Please tell me what is the capital city of France?" may be "What is the capital city of country?" rather than "Please tell me what is the capital city of country?". Nevertheless an appropriate generic query may be identified by identifying the generic query which includes the same relations and entity classes as the query. The generic query may for example be selected from a plurality of generic queries. This may be considered to correspond to exemplar mapping, in that the generic query may be considered to correspond to an exemplar of the semantic parse (as identified at item 180).

At item 186 of FIG. 8, the entity class is replaced in the generic query by the entity to generate the rephrased version of the query. In the above example, the entity class country may therefore be replaced by the specific entity France to obtain "What is the capital city of France?" as the rephrased version of the query.

The method of FIG. 8 may allow the rephrased version of the query to be supplied efficiently to various different query-answering subsystems. For example, a relatively generic rephrased version of the query may be compatible with a larger number of different query-answering subsystems than other types of rephrased queries, without requiring format conversions.

As described with reference to FIG. 2, once an answer to a rephrased version of a query has been obtained, feedback on the rephrased version of the query may be sought. An example of seeking feedback is illustrated in the flow diagram of FIG. 9. At item 188 feedback is requested. For example, a system for processing queries may send a message to a user requesting feedback. Such a message may be in various different formats. Where the system includes a speech-controlled device, the message may be an audio message, which is played to the user by the speech-controlled device. Alternatively, the message may be a text message, which is sent to the user as an email, a text message (sometimes referred to as an SMS message or short message service message), or is displayed to the user on a screen coupled to the system for processing queries.

Figure 9:
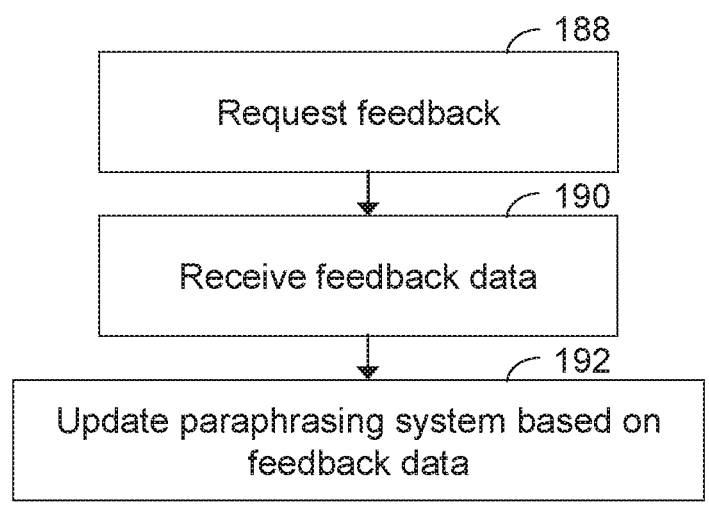
FIG. 9 is a flow diagram showing use of feedback in example methods involving rephrasing a query.

At item 190 of FIG. 9, feedback data is received. For example, the feedback data may be received in response to audio data including an answer to the query (or an answer to the rephrased version of the query). As explained above, the user may provide feedback in a variety of different formats. For example, the user may be asked to confirm whether the answer satisfactorily answered the query, providing a "yes" or "no" response (or, in some cases, other responses as well as or instead of "yes" or "no"). Variations of a "yes" or "no" response, which may not be immediately identifiable as corresponding to positive feedback or negative feedback may be recognized, for example by a statistical model, and classified into positive or negative feedback. The feedback data may be stored in a storage system, such as a file system, a cloud computing web service such as the Amazon Simple Storage Service (Amazon S3 service) offered by Amazon Web Services, Inc., or a relational database management system (RDBMS).

At item 192 of FIG. 9, the paraphrasing system is updated based on the feedback data. The feedback data may be used to enhance a precision of the paraphrasing system. For example, the feedback data may be used to compute a list of query-answer pairs that are identified as likely to elicit positive feedback. Such a list may be stored in various forms, such as a raw form (for example as a hash map) or in an efficient probabilistic compressed representation (such as a Bloom filter). This list may be used as an answer filter, for example as described with reference to FIG. 5.

Figure 10:
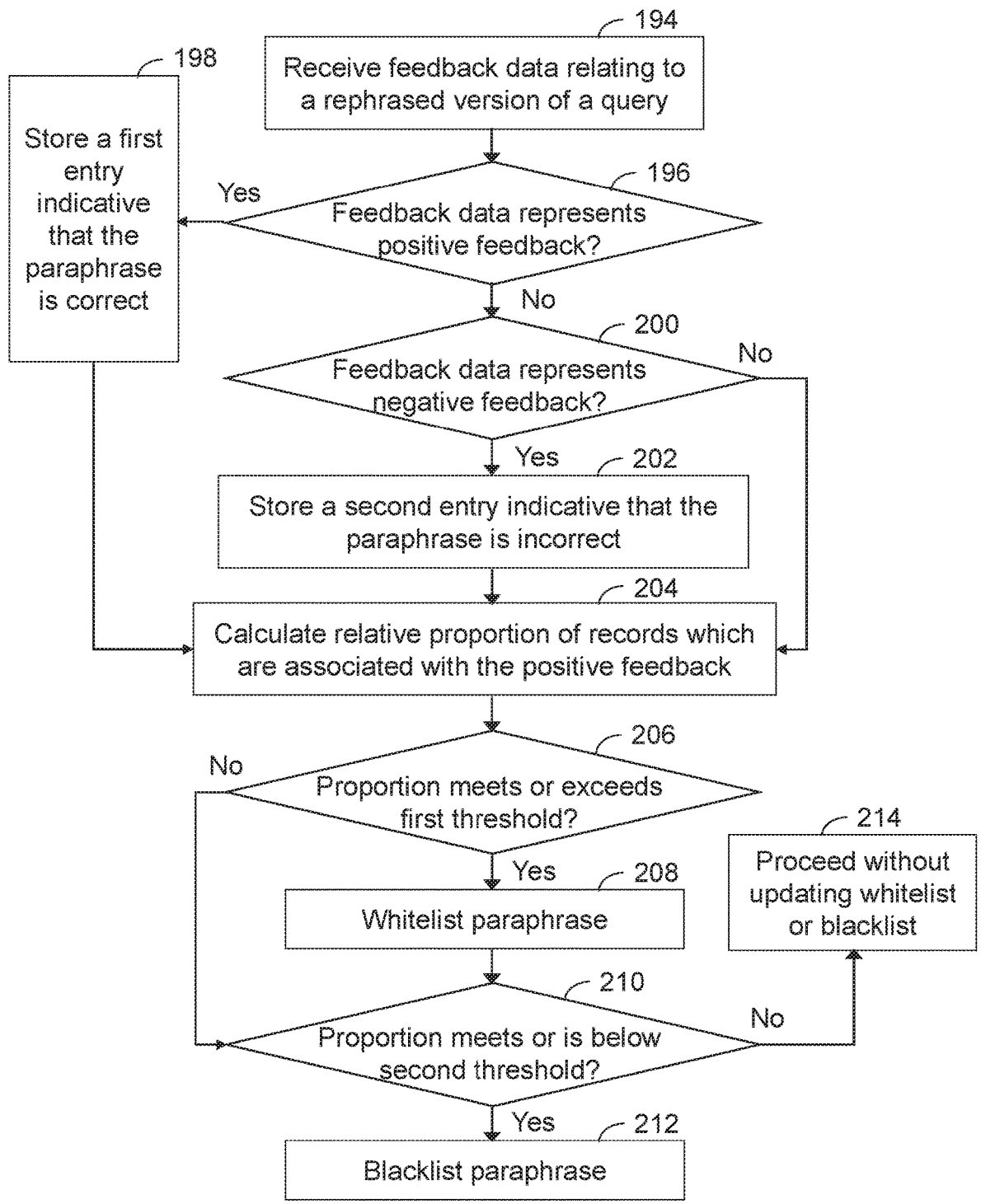
FIG. 10 is a flow diagram showing use of feedback in further example methods involving rephrasing a query.

An example of using feedback data to update a paraphrasing system is illustrated in the flow diagram of FIG. 10. At item 194 of FIG. 10, feedback data relating to a rephrased version of a query is received. At item 196 of FIG. 10, it is determined whether the feedback data represents positive feedback. As explained with reference to FIG. 9, this may be relatively straightforward where the user provides feedback in the form of a "yes" or "no" answer (or as a number which can be straightforwardly associated as corresponding to positive feedback or negative feedback). However, where the user provides a narrative response, determining whether the feedback is positive or negative may involve processing the response from the user, for example using a trained machine learning model, to identify a sentiment of the response. It may therefore be determined whether the response from the user is broadly positive (indicating that the user is satisfied with the answer they have received) or is broadly negative (indicating that the user is dissatisfied with the answer they have received).

If it is determined that the feedback data represents positive feedback indicative that the rephrased version of the query satisfactorily captures a meaning of the query, the method of FIG. 10 involves, at item 198, storing, in a set of records associated with the rephrased version of the query, a first entry indicative that the rephrased version of the query satisfactorily captures the meaning of the query. As explained with reference to FIG. 9, this may involve adding to records stored in the storage system, to include an indication that the user has provided positive feedback relating to a particular pair of a rephrased version of a query and an answer to that query. For example, there may be an entry for each query-answer pair for which feedback has been received, along with a count or other measure of an amount of positive feedback received. The set of records may for example be records of a database or other storage structure for efficiently storing large amounts of data.

If the feedback data does not represent positive feedback, the method of FIG. 10 involves, at item 200, determining whether the feedback data represents negative feedback. It is to be appreciated though, that in examples in which feedback is considered to be only either positive or negative, this item may be omitted and the feedback may be considered to be negative if it is not determined to be positive feedback at item 196. In such cases, however, a determination of whether the feedback is negative may be performed instead of a determination of whether the feedback is positive. In these cases, if it is determined that the feedback is not negative, the feedback may therefore be considered to be positive.

In the example of FIG. 10, though, a separate determination is made as to whether the feedback is positive or negative. This allows for the possibility that the feedback may be neutral or neither positive nor negative. If it is determined that the feedback data represents negative feedback indicative that the rephrased version of the query fails to satisfactorily capture the meaning of the query, the method of FIG. 10 involves, at item 202, storing, in the set of records, a second entry indicative that the rephrased version of the query fails to satisfactorily capture the meaning of the query. The second entry may be similar to the first entry described above, except that it indicates that a query-answer pair for the rephrased version of the query and the answer provided to the user has attracted negative feedback rather than positive feedback.

After the first or second entries have been stored in the set of records (either at item 198 or item 202), which may be considered to correspond to updating the set of records, or after it has been determined that the feedback is neither positive nor negative (which in the example of FIG. 10 involves not storing the first or second entries in the set of records), the method of FIG. 10 involves calculating a proportion of records of the set of records which are associated with positive feedback, at item 204. This calculation may involve dividing the number of positive feedback responses received for a particular query-answer pair by the total number of feedback responses for that query-answer pair (where the query is for example a rephrased version of an initial query). This is merely an example, though, and other metrics may be calculated to determine whether the feedback for a given query-answer pair is sufficiently positive for the rephrased version of the query to be considered to accurately capture the meaning of the query with relatively high confidence. If it is assumed that the feedback is either positive or negative the proportion of records of the set of records which are associated with positive feedback may be calculated based on a division of the number of negative feedback responses by a total number of feedback responses, and subtracting this from 1, for example. In the case of paraphrasing techniques which apply rule-based transformations, feedback data may be aggregated over query-answer pairs, for example by the type of transformation involved in producing the rephrased version of the query, to enable generalization from a particular query-answer pair.

Based on the proportion of records calculated at item 204, the paraphrase data may be stored in a first data structure including first data representative of at least one unsatisfactory paraphrase of the query (which for example represents blacklisted paraphrases), or in a second data structure including second data representative of at least on satisfactory paraphrase of the query (which for example represents whitelisted paraphrases).

This is illustrated in the example of FIG. 10. At item 206 of FIG. 10, if it is determined that the proportion of records which are associated with positive feedback meets or exceeds a first threshold, the paraphrase data representative of the rephrased version of the query is stored in the second data structure (and is therefore whitelisted), at item 208 of FIG. 10. The first threshold in this example therefore represents a threshold for a rephrased version of a query to be considered a satisfactory paraphrase of the query, which has a satisfactory answer.

Similarly, if it is determined at item 210 of FIG. 10 that the proportion meets or is less than a second threshold, the paraphrase data is stored in the first data structure (and is therefore blacklisted), at item 212 of FIG. 10. The second threshold in this example therefore represents a threshold for a rephrased version of a query to be considered unsatisfactory, either in that it does not accurately represent the original query or that the answer to the rephrased version of the query is not satisfactory (for example, incorrect). In examples such as this, the second threshold is therefore lower than the first threshold.

If it is determined that the proportion lies between the first and second thresholds, which for example indicates that the query-answer pair has had relatively neutral feedback, the method may proceed without updating the whitelist or the blacklist, as at item 214 of FIG. 10.

As will be appreciated, various other methods may be used to determine whether a query-answer pair (for a particular rephrased version of a query) should be whitelisted or blacklisted. For example, a plurality of entries associated the rephrased version of the query may be retrieved from the set of records (for example from a database, or other storage system). Each of the plurality of entries may be indicative of feedback, respectively. For example, each entry (corresponding to a particular instance of feedback for a given query-answer pair) may include a score, such as a 0 or 1, indicating whether the feedback was positive or negative for that instance of feedback.

A first number of entries which are associated with positive feedback indicative that the rephrased version of the query is a satisfactory paraphrase of the query may be identified. Similarly, a second number of entries which are associated with negative feedback indicative that the rephrased version of the query is an unsatisfactory paraphrase of the query may be identified. A metric based on the first and second numbers may be calculated and used to determine whether the rephrased version of the query (which is part of the query-answer pair for which the feedback was sought) is to be blacklisted or whitelisted.

For example, a difference between the first number and the second number may be calculated. If it is determined that the difference meets or exceeds a first threshold (which may be similar to the first threshold of FIG. 10, albeit with a different numerical value) the rephrased version of the query maybe stored in a second data structure, such as a whitelist database, as a whitelisted paraphrase. Conversely, if it is determined that the difference meets or is less than a second threshold (which may be similar to the second threshold of FIG. 10, albeit with a different numerical value) the rephrased version of the query may be stored in a first data structure, such as a blacklist database, as a blacklisted paraphrase.

Yet further methods may be used to update a whitelist and/or a blacklist. For example, a statistical significance test, such as a single tailed binomial test, may be applied to feedback data. Such a statistical significance test may be performed on the basis of a proportion of records which are associated with positive feedback (or, conversely, with negative feedback). This may be used to determine whether a deviation of observed numbers or counts of positive or negative feedback from a theoretically expected number of instances of positive or negative feedback is statistically significant. If a quantity of positive or negative feedback for a particular rephrased version of a query is determined to be statistically significant, the rephrased version of the query may be whitelisted or blacklisted accordingly. As detailed further below, the whitelist and/or the blacklist may be updated periodically, such as at a daily cadence (in other words, once a day).

Figure 11:
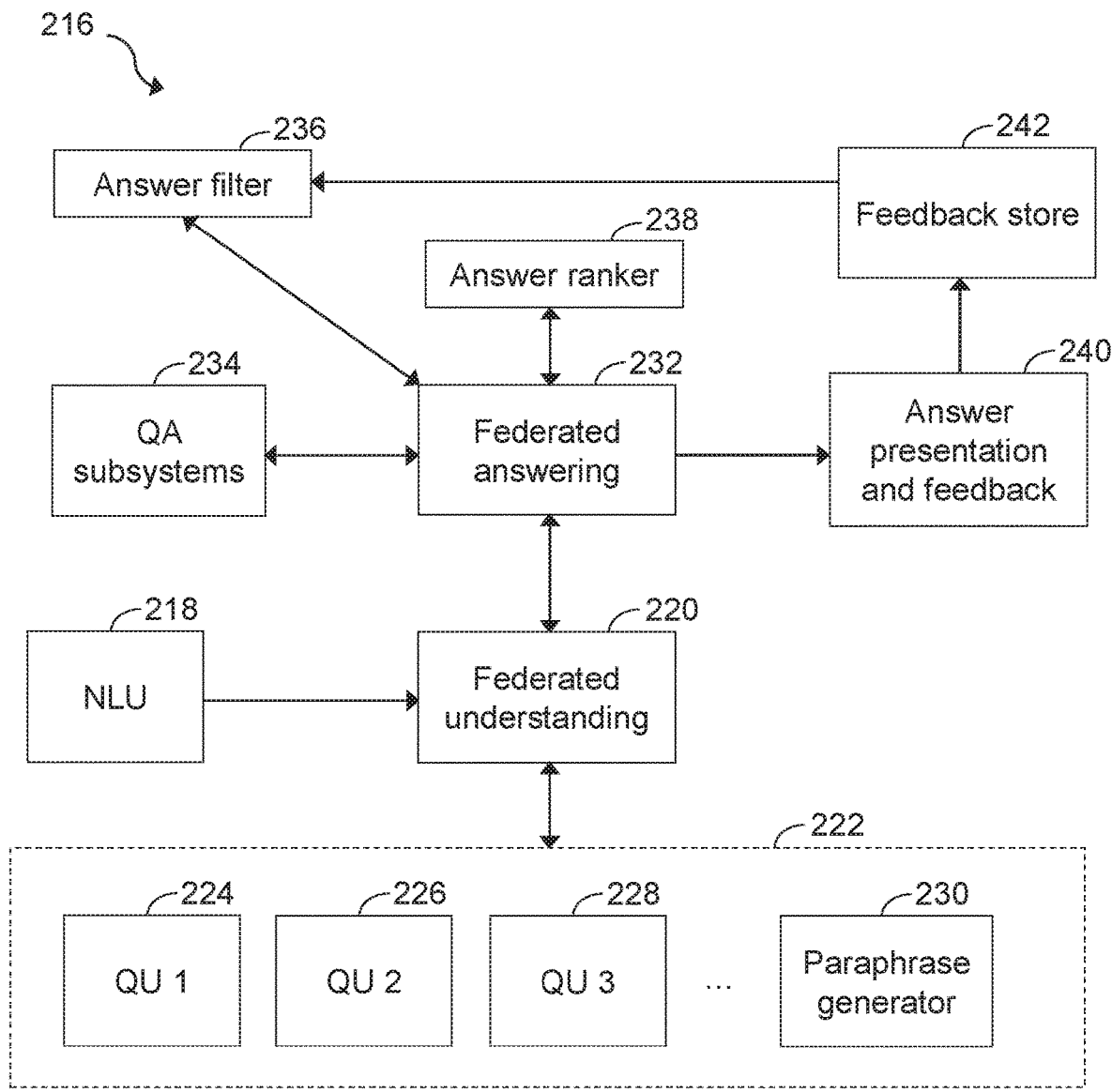
FIG. 11 illustrates schematically components of a system for use with the methods described herein.

FIG. 11 illustrates schematically components of a system 216 for use with the methods described herein. The system includes an NLU coordinator 218. The NLU coordinator 218 sends a query to a federated understanding system 220. A federated system is for example any system which includes a plurality of different subsystems each providing an alternative approach to performing the same function or a similar function. As will be appreciated from the examples herein, such a function is for example NLU or query-answering. The federated understanding system interfaces with a plurality of different NLU subsystems 222, each arranged to perform NLU of an input, such as the query. NLU may involve relation extraction (which for example relates to determining relationships or other facts between entities) in addition to named entity recognition (which for example involves identifying entities, including named entities) and named entity resolution (sometimes referred to as named entity linking, which generally involves resolving ambiguities that may be present where there are two entities that relate to different concepts or objects but are nevertheless represented by the same word).

In the example of FIG. 11, the NLU subsystems 222 include first, second and third NLU subsystems 224, 226, 228 as well as a paraphrase generator 230 (which may be referred to as a paraphrasing system), which may be considered to perform a form of NLU by providing an alternative phrasing of an input query. Internal components of an example paraphrase generator are shown in more detail in FIG. 12. Example NLU subsystems are rule-based systems, knowledge base querying systems and information retrieval based systems, although other systems or methods may be used for NLU instead.

A rule-based system may include hardcoded answers to common queries. Such a rule-based system may additionally or alternatively involve the application of certain rules to a query to identify its suitability for being answered by a hardcoded answer. Such rules may for example include regular expressions (commonly referred to as "regexes"), which are a sequence of characters. This sequence of characters may be searched for in the query (for example using a string searching algorithm), and removed or replaced with other characters. The sequence of characters which may be searched for by a rule-based system (and whether they are removed or replaced when they are found in a query, and what they are replaced by) may be handcrafted based on common expressions that may occur in typical questions.

A knowledge base querying system may be used to obtain a representation of the query as a query over a knowledge base. For example, the query may be represented in the form of entities and relations, which correspond to entities and relations that are present in a knowledge base to be used for answering the query (as discussed further below).

An information retrieval based system for example uses full-text or context-based indexing of text data from a collection of different sources, such as documents, data structures such as databases, or metadata associated with documents. For example, an information retrieval based system may search the collection of sources for an exact or partial match between text content of the collection of sources and some or all of the query (which may also be in the form of text). The collection of sources may for example include information sources such as encyclopedia articles, news articles or scientific papers.

The plurality of NLU subsystems 222 may be implemented as web services. As an example, an NLU subsystem may consume an input in the form of text, which for example represents natural language. The input may also include metadata, such as audio (if the query is received as an utterance from a user), a location indicating where the input originated, device-dependent environmental features indicative of an environment of the device which captured the input and which may affect the input, user-dependent features (which may help remove ambiguity, for example where a word has two different meanings), or conversational context.

The federated understanding system 220 of FIG. 11 interfaces with a federated answering system 232. The federated answer system 232 provides an input, which may be received as an understanding provided by the federated understanding system 220 or from another system or systems of an NLP system, for example as text data, to a plurality of query-answering subsystems 234, which are illustrated further in FIG. 13. The federated answer system 232 and the plurality of query-answering subsystems 234 may be considered to correspond to a query-answering system as described herein. Such a query-answering system tries to provide an answer or answers to a query (although this may not be possible, if the query-answering subsystems 234 do not include an answer to this query).

Answers obtained by the federated answer system 232 are sent to an answer filter 236. The answer filter 236 for example performs whitelisting and/or blacklisting as described above.

The answers remaining after filtering by the answer filter 236 are then processed by an answer ranker 238. As explained above, the answer ranker 238 may be used to rank between multiple candidate answers to a query or a rephrased version of a query to choose which answer to provide to a user (or to choose not to return an answer to a query, if all the answers are for example determined to be low-quality). The answer ranker 238 for example consumes a query-answer pair (where the query may be the original query or a rephrased version of the query) and returns a suitability score, indicative of a suitability of a particular query-answer pair. The answer ranker 238 may instead or additionally receive other data, such as metadata, for example relating to the original query (where the original query has been rephrased). This may then be used by the answer ranker 238 to ascertain a quality of the rephrasing of the query. Among the other data the answer ranker 238 may receive may be metadata summarizing the paths or routes taken to understand and answer the query, such as which of the NLU subsystems 222 were used to understand the query or which of the query-answering subsystems 234 were used to provide the answer to the query. The answer ranker 238 may be updated periodically. For example, where the answer ranker 238 uses a machine learning based model, the model may be retrained every so often, which may be at regular intervals, based on queries and feedback that have been received.

Once a suitable answer has been identified by the answer ranker 238, the answer may be presented to the user, using an answer presentation and feedback system 240. This system may for example be a speech-controlled device, in which the answer is returned as audio. Alternatively, this system may be a different device, such as a computer device, with the answer returned as audio or in a different format, such as text.

Feedback received in response to a request for feedback may then be stored in a feedback store. This feedback may then be used to update the answer filter 236, as described above with reference to FIGS. 9 and 10.

Figure 12:
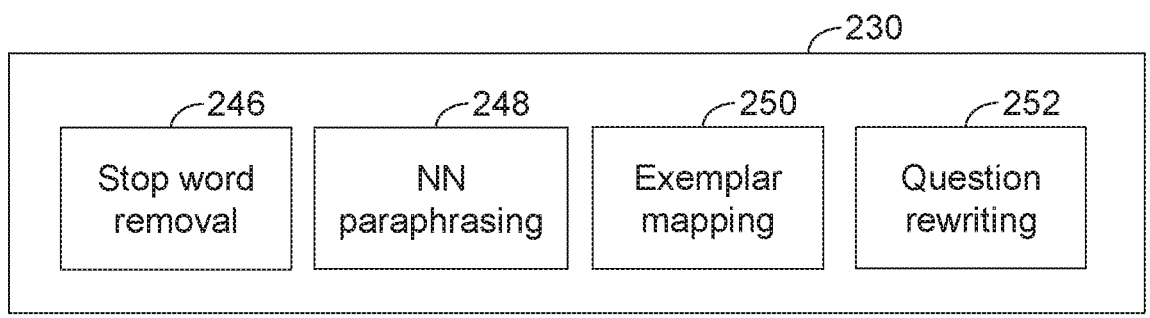
FIG. 12 illustrates schematically components of a paraphrasing system according to examples.

FIG. 12 show schematically internal components of the paraphrase generator 230 of FIG. 11, which may be considered to be an example of a paraphrasing system. The paraphrase generator 230 in this example includes various different paraphrasing subsystems. In this case, the paraphrase generator 230 includes a stop word removal system 246 which for example transforms queries by removing stop words. The paraphrase generator 230 also includes a nearest neighbor paraphrasing system 248, which for example performs nearest neighbor paraphrasing as described above with reference to FIG. 7. The paraphrase generator 230 includes an exemplar mapping system 250, which for example performs shallow-parse-exemplar-mapping as described with reference to FIG. 8. Where the nearest neighbor paraphrasing system 248 and/or the shallow-parse-exemplar-mapping system 250 include machine learning models, such models may be updated, for example by retraining, over time, such as at a regular interval. For example, these models may be retrained or tuned based on feedback on queries received and processed since a previous update. These models may be retrained offline (for example, without forming part of an active system which is available or accessible to users) and then redeployed periodically.

The paraphrase generator 230 also includes a question rewriting system 252. The question rewriting system 252 may be similar to or the same as a whitelist, which may be generated as described above. For example, the question rewriting system 252 may be used to identify particular pairings of a query and satisfactory rephrased version of the query, allowing the query to be replaced by the satisfactory rephrased version of the query. Although the question rewriting system 252 may be updated using feedback obtained from users, in other examples the question rewriting system 252 may include pairings that are generated in a different way. For example, a human operative may populate the question rewriting system 238 with high quality pairings. Typically, the question rewriting system 252 is populated and updated offline. For example, the question rewriting system 252 may be updated periodically, such as every 24 hours, rather than being updated in real time or otherwise on-the-fly, as new queries are received. This may improve the stability of the system and reduce system outages in which the system is unavailable for processing of new queries due to internal updates. For example, feedback data may be accumulated over time, such as over a rolling window of time periods. This feedback data may be consolidated and used to update the question rewriting system 252. Similarly, this feedback data may also be used to update a blacklist, which may form part of an answer filter. In some cases, different versions of the question rewriting system 252 may be provided to different user samples or different utterance samples. This may be used to gain further insight into the interaction between different users and the question rewriting system 252, which may be used to further refine the question rewriting system 252.

The paraphrase generator 230 may be used to generate what may be considered to be partial understandings of a query during NLU. Each partial understanding may correspond to a different respective rephrased version of the query. These rephrased versions of the query may be considered "partial" understandings in that these rephrased versions of the query may not necessarily accurately or satisfactorily capture the underlying meaning of the query.

The paraphrase generator 230 of FIG. 12 is merely an example, though. In other examples, a paraphrasing system may omit some of these paraphrasing subsystems or may include different paraphrasing subsystems instead of or as well as those shown in FIG. 12. Furthermore, in some cases, the paraphrasing system may include solely one model for obtaining a rephrased version of a query, such as one of the paraphrasing subsystems, rather than a plurality of different paraphrasing subsystems.

Figure 13:
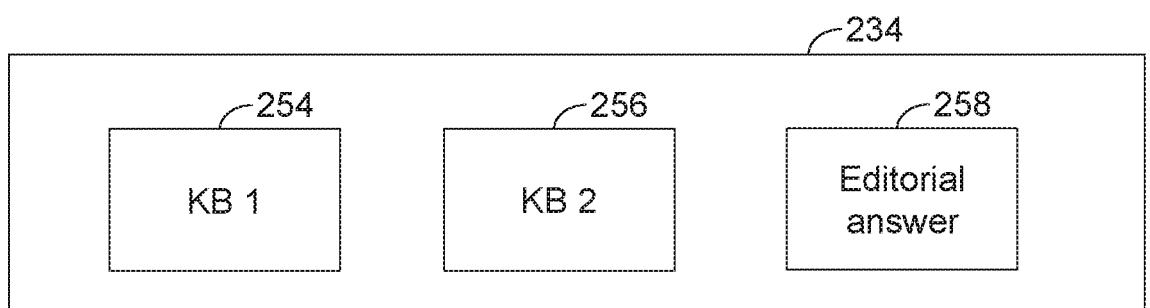
FIG. 13 illustrates schematically components of a query-answering system according to examples.

FIG. 13 shows schematically internal components of the query answering subsystems 234 of FIG. 11. In this example, the query answering subsystems include a first knowledge base 254, a second knowledge base 256 and an editorial answering system 258, which for example provides narrative answers to queries. The first and second knowledge bases 254, 256 may for example include different facts than each other. For example, the first and second knowledge bases 254, 256 may have been populated differently from each other, for example using different input data sources.

A knowledge base (sometimes referred to as a knowledge database) typically includes numerous facts, usually in the form of fact triples (sometimes referred to simply as a "triple"). A fact triple generally corresponds to a particular subject-predicate-object expression, which can be used in computer-based question answering. For example, a knowledge database that includes facts that express the relationship between a subject and a predicate allows a question based on two of the subject-predicate-object fact triple to be answered using the knowledge database. Such fact triples can be expressed in the form of predicate (subject, object), where the predicate is a relationship or other relation and the subject and object may be considered to be entities that participate in that relationship. A knowledge base may be in the form of a graph, with a node of the graph corresponding with an entity (which may be identified in a query using NLU) and an edge of the graph corresponding with a relation (which may also be identified using NLU). An entity of a knowledge base may be associated with entity text, which denotes or represents the entity associated with the entity text. The entity text data may for example be used to search for entities within the knowledge base, for example using a string matching technique. This may therefore allow answers to a query to be located in the knowledge base. For example, if a query includes two components of a fact triple, which may be expressed in the form of predicate (subject, object), the knowledge base can be queried to locate, for example, entities corresponding to the subject and the object, connected by a relationship corresponding to the predicate. The answer to the query can then be returned, for example by returning the missing component of the fact.

In other examples, answers may be obtained in other ways from a knowledge base. For example, a knowledge base may be queried using a template representative of a query and identifying portions of the knowledge database that either exactly match the template or that match the template to a certain statistical degree. The template may be obtained from natural language (such as natural language representative of the query) using NLP techniques that would be familiar to the skilled person. In cases in which the knowledge base is structured as a graph, with a plurality of nodes and a plurality of edges, a template representing a query may also be in the form of a graph. As explained above, a subject or object of a fact triple may correspond with a node of the graph and a predicate of a fact triple may correspond with an edge of the graph. In such cases, a template graph representing the query may include a first node corresponding with a subject, a second node corresponding with an object and an edge connecting the first node to the second node, which represents the predicate. An answer to such a query may be retrieved from the knowledge base by determining a portion of the graph representing the knowledge base (for example including two nodes and an edge connecting the two nodes) that corresponds with or otherwise matches the template graph, either exactly or to a certain level of statistical certainty.

An editorial answering system such as the editorial answering system 258 of FIG. 13 may for example be used to return narrative or other long-form answers to a given query. The editorial answering system 258 may involve sending the query to a human analyst, for example, and requesting an answer from the analyst. It is to be appreciated, though, that in some cases the role of the analyst may be automated, for example using machine learning. It is to be appreciated that FIG. 13 is merely an example, though, and other query-answering systems may include more, fewer or different query-answering subsystems than those shown in FIG. 13.

Figure 14:
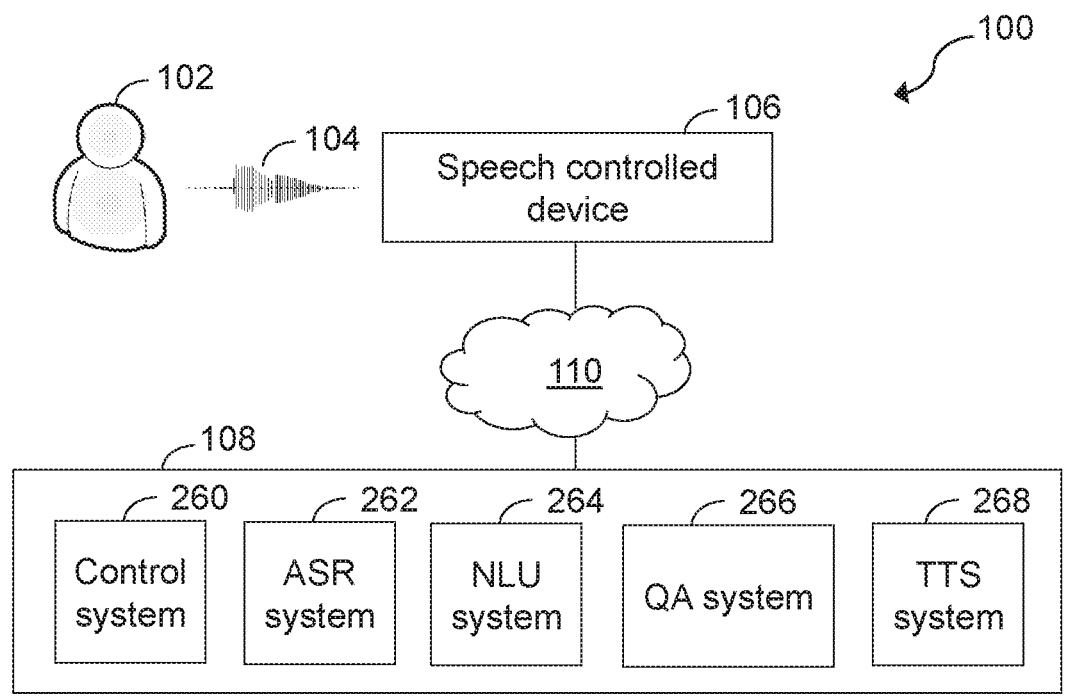
FIG. 14 illustrates the example system of FIG. 1 in more detail.

FIG. 14 shows in more detail the example system 100 of FIG. 1. The system of FIG. 14 includes the speech processing system 108 of FIG. 2, which is shown in more detail in FIG. 14, although it is to be appreciated that the methods described herein may be performed using systems arrange to receive inputs in other formats than speech, such as systems arranged to receive text input rather than voice input (sometimes referred to as spoken input). As will be appreciated, the system of FIG. 14 is merely illustrative; the methods described herein may be performed using a number of different devices and computer systems, including, for example, general-purpose computing systems, server-client computing systems, mainframe computing systems, telephone computing systems, laptop computers, cellular phones, personal digital assistants (PDAs), tablet computers, far field devices such as the Amazon Echo, automobile computer systems, robots or other mobile devices such as wearable devices like smart watches.

For example, the methods described herein may be performed using a system including at least one processor and at least one memory comprising computer program instructions. The at least one processor and the at least one memory may be located in the same computer device, or the at least one processor and the at least one memory may be located in different devices, such as in a distributed computer system, such as a cloud computer system.

The at least one processor may be a central processing unit (CPU) for processing data and computer-readable instructions. In other examples, the at least one processor may be a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computer devices, e.g., a combination of a DSP and a microprocessor, a plurality of microprocessors, one or more microprocessors in conjunction with a DSP core, or any other such configuration. The at least one processor may be coupled, using one or more buses, to read information from or write information to one or more memories, such as the at least one memory. The at least one processor may additionally, or in the alternative, contain memory, such as processor registers.

The at least one memory may include volatile random access memory (RAM), non-volatile read only memory (ROM), and/or other types of memory. In other examples, the at least one memory may be a data storage component of a computer device, for storing data and instructions. The data storage component may include one or more storage types such as magnetic storage, optical storage or solid-state storage. Computer instructions for processing by the at least one processor for operating the computer device and its various components in accordance with the methods described herein may be executed by the at least one processor and stored in the at least one memory. Some or all of the executable instructions may be embedded in hardware or firmware in addition to or instead of software. The methods described herein may be implemented in various combinations of software, firmware, and/or hardware, for example.

In FIG. 14, the speech controlled device 106 is arranged to capture the spoken utterance 104 of the user 102 via an audio capture device such as a microphone or a microphone array. The audio capture device may be integrated into or may be separate from the speech controlled device 106. The speech controlled device 106 may also include at least one speaker, for example for providing audio output for responding to a user in response to the user's utterance 104, for example based on NLU of the user's utterance 104, to provide an appropriate response to the user's utterance, such as an answer to a question asked by the user. The speech controlled device 106 may be part of a computer device, such as a device with computational capability such as a laptop or personal computer; a mobile or a cellular phone. For example, the speech controlled device 106 may be or form part of various different electronic devices such as a mobile phone (sometimes referred to as a cellular phone or cell phone), a far field device such as the Amazon Echo, a tablet, an automobile, a robot, or a wearable device such as a smart watch.

The speech controlled device 106 transmits the utterance 104 over the network 110 for receipt by other components of the system of FIG. 14. The utterance 104 may be processed by the speech controlled device 106, or other components accessible to the speech controlled device 106, for example to reduce noise or improve a quality of the captured utterance before the utterance 104 is transmitted. The network 110 may be any suitable data network, for example a computer network such as the Internet, a local area network, a wide area network, a telecommunications network, a wired network, a wireless network, or some other type of network, or may include a series of networks such as these.

In the example of FIG. 14, the utterance 104 is transferred from the speech controlled device 106 to a control system 260 of the speech processing system 108. The control system 260 then sends the utterance 104 to an automatic speech recognition (ASR) system 262 of the speech processing system 108 for converting the utterance 104, which may be in the form of audio data to text data. The audio data may be in the form of a digitized representation of an audio waveform of the utterance 104.

Audio data may be processed in real time or may be saved and processed at a later time. Audio data may be input to the ASR system 262 which then interprets the utterance 104 represented by the audio data based on the similarity between the utterance 104 and models known to or accessible to the ASR system 262. For example, the ASR system 262 may compare the input audio data with models for sounds (e.g., subword units or phonemes) and sequences of sounds to identify words that match the sequence of sounds spoken in the utterance 104. The different ways an utterance may be interpreted may each be assigned a probability or a recognition score representing the likelihood that a particular set of words matches those spoken in the utterance 104. The recognition score may be based on a number of factors including, for example, the similarity of the sound in the utterance 104 to models for language sounds (e.g., an acoustic model), and the likelihood that a particular word which matches the sounds would be included in the sentence at the specific location (e.g., using a language or grammar model). Based on the considered factors and the assigned recognition score, the ASR system 262 may output the most likely words recognized in the audio data The ASR system 262 may also output multiple alternative recognized words in the form of a lattice or an N-best list.

The ASR system 262 of FIG. 14 includes an echo cancellation filter, an acoustic front end (AFE), a speech recognition engine, and speech storage. The echo cancellation filter for example compares audio that is output by the user 102 of the speech controlled device 106 with sound picked up by the audio capture device of the speech controlled device 106, and removes the output sound from the captured sound in real time. Echo cancellation is commonly used by cellular telephones and other telephones operating as speaker phones, and facilitates the ASR process by removing a component of captured sounds that can interfere with speech recognition.

The AFE transforms the audio data after echo cancellation into data for processing by the speech recognition engine. The speech recognition engine compares the speech recognition data with the acoustic, language, and other data models and information stored in the speech storage for recognizing the speech contained in the original audio data. The AFE and speech recognition engine may include their own controller(s)/processor(s) and memory or they may use at least one processor and the at least one memory of the speech processing system 108 (which may be accessible to other components of the speech processing system 108), for example. Similarly, the instructions for operating the AFE and speech recognition engine may be located within the ASR system 262, within at least one memory and/or storage of the speech processing system 108, or within an external device.

The AFE within the ASR system 262 may divide the digitized audio data into frames, with each frame representing a time interval, for example 10 milliseconds (ms). During that frame the AFE determines a set of values, a feature vector, representing the features/qualities of the utterance portion within the frame. Feature vectors may contain a varying number of values and represent different qualities of the audio data within the frame. Audio qualities of points within a frame may be stored into feature vectors. Feature vectors may be streamed or combined into a matrix that represents a time period of the spoken utterance 104.

These feature vector matrices may then be passed to the speech recognition engine for processing. A number of approaches may be used by the ASR system 262 and AFE to process the audio data. Such approaches may include using mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine attempts to match received feature vectors to language phonemes and words such as may be known in storage or at least one memory accessible to the ASR system 262. The speech recognition engine may compute recognition scores for the feature vectors based on acoustic information and language information. The acoustic information may be used to calculate an acoustic score representing a likelihood that the intended sound represented by a group of feature vectors match a language phoneme. The language information may be used to adjust the acoustic score by considering what sounds and/or words are used in context with each other, thereby improving the likelihood that the ASR system 262 outputs speech results that make sense grammatically.

The output of the ASR system 262 in FIG. 14 is in the form of text data, representative of text. Text data may be in any suitable format for representing text. For example, text data may be in the form of one or more strings, where a string is typically a sequence or series of characters. A string is generally considered to be a data type, which may be implemented using an array data structure, with elements of the array storing characters of the sequence of characters corresponding to the string. Alternatively, text data may be represented as a vector, such as a feature vector, or an array of vectors. For example, each feature vector may be considered to correspond to a separate word of the utterance 104, such that the utterance 104 may be represented as an array of feature vectors. Alternatively, the utterance 104 may be represented using solely one vector, which may be formed by concatenating feature vectors representative of individual words of the query. It is to be appreciated that the format of text data may be modified as the text data is transferred between different components of a system such as that of FIG. 14, and may differ depending on the components of the system. For example, where the methods described herein are employed in a system in which text data corresponding to a query is submitted by a user, the text data representative of the query may be in the form of a string. If, however, the methods described herein are employed within a speech processing system such as that of FIG. 14, the text data may be in the form of a vector. In other examples, the ASR system 262 may output multiple alternative recognized words in the form of a lattice or an N-best list, in addition to or instead of text data.

Following ASR processing, the text data generated by the ASR system 262 of FIG. 14 is sent by the ASR system 262, for example via the control system 260, to an NLU system 264 of the speech processing system 108 for further speech processing. The NLU system 264 may also receive textual input from another source, such as via an I/O component of the speech processing system 108. The NLU system 264 may include a dedicated NLU engine, processor, memory, storage, named entity recognition (NER) system and/or other components, and/or may use components otherwise available on or accessible to the speech processing system 108. The NLU system 264 may for example be or include a federated understanding system, such as that of FIG. 11 and may therefore include subsystems such as the NLU subsystems 222 of FIG. 11. As explained above with reference to FIG. 11, the NLU system 264 for example takes the text data output from the ASR system 262 and attempts to make a semantic interpretation of the text data. That is, the NLU system 264 may determine the meaning behind the text, for example based on the individual words, and then may execute a command based on the meaning or pass a command to a downstream application for execution. The NLU processing is based on the models and programming available to the NLU system 264. Such models may be grammar based, rule based, or constructed in a different manner.

NER processing typically involves processing a sequence of words in a textual input, recognizing and identifying specific important words, called entities, of an NLU textual input and assigning a tag or label to those words, which may be performed by a NER system of the NLU system 264. The tag or label is a classification of the associated word that may assist eventually implementing the user's utterance 104. Certain parts of speech (such as conjunctions that join phrases, clauses and sentences) may be considered less important, thus not considered an entity and may not receive a tag.

As part of determining what (if any) tag to apply to each word, the NER system may consider textual context information, such as what words come before or after the word being processed or what other words appear in the sentence. These factors to consider in processing, called features, are indicated to the NER system through feature vectors. Each word in the sequence of words is associated with a corresponding feature vector. The feature vector is a long data structure which indicates what circumstances apply to the particular word. For example, an NLU system 264 may have access to an index of thousands of words that are known to the system. The feature vector may include an entry for all or a subset of the words in the index to indicate whether the selected word of the index is the actual word being processed, whether a word in the index is located in the same sentence as the word being processed, or whether a word in the index is directly before or after the word being processed. The information in the feature vector may then influence the NER processing in its attempt to tag the text.

A feature vector may include components that are binary features that may be effectively "yes or no" indicators or may include non-binary values. Other information about the text may also be indicated to the NER system through entries in the feature vector. The individual feature vectors for specific words are typically sparse, meaning that only a small subset of the feature vector entries have a non-zero value. The information represented by the feature vector entries are typically defined when training the models used by the NER system. When performing NER, the NER system thus may process the feature vector associated with the word, rather than processing the word itself.

Generally, models used for NER may be trained with feature vectors such as those associated with words during NER processing, with the feature vectors capturing the word identity as well as other information that may be pertinent to that word (e.g. contextual and other information as mentioned above). Known models that may be used in NER include maximum entropy models (also known as log-linear models), such as Maximum Entropy Markov Models (MEMMs) or Conditional Random Fields (CRFs). The underlying model may apply weights to certain of the data/feature-components associated with the word and included in the feature vector. The weights may determine the relative importance of each of the feature vector components. Feature vector weights may be applied during training where the underlying NLU model essentially provides the set of weights that are trained on a certain set of data/words and those weights indicate how important each of those feature vector components are. Thus the NER model internally has weight vectors that have the same dimension as the actual feature vectors and when the NER system is predicting the labels, it may calculate an inner product (or dot product) of the feature vector and the weight vector so that each individual feature of the feature vector is properly weighted.

The further processing of the text data performed by the NLU system 264 therefore attempts to make a semantic understanding of the text data, for example to identify an intent of the text data. In this way, the NLU system 264 may be used to identify that the text data (which may for example be first text data as described above) represents a query. In this way, the NLU system 264 may therefore identify understandings of the query.

In parallel or after receiving a representation of the query from the NLU system 264, the query (or the representation of the query) may be sent to the query-answering system 266 in an attempt to obtain an answer to the query represented by the utterance 104. The query-answering system 266 may for example be a federated answering system such as that of FIG. 11. The query-answering system 266 may for example include the query-answering subsystems 234, the answer filter 236 and the answer ranker 238 of FIG. 11. If the query-answering system lacks an answer to the query (or lacks a satisfactory answer to the query), a rephrased version of the query may be obtained, for example from the NLU system 264, such as from a paraphrasing system of the NLU system 264, or from another system or systems. An answer to the rephrased version of the query may then be sought as described above.

Once an answer to the query or the rephrased version of the query is received or otherwise obtained by the query-answering system 266, text data representative of an answer (such as the third text data described above), may be converted to audio data for output to the user 102, for example using a text to speech system 268 of the speech processing system 108. The text to speech system 268 of FIG. 14 may include a speech synthesis system for generating the audio data from the text data representative of the answer, which may be a separate system or component or integrated with other systems or components of the system of FIG. 14.

In this and other examples, the speech processing system 108 may be a network-distributed service, which may be referred to as a "cloud" service. In other words, for example, the speech processing system 108 are accessible to the speech controlled device 106 via the network 110 but are not stored directly on or as part of the speech controlled device 106. The speech processing system 108 is instead stored in at least one remote device, such as a computer device that is remote from the speech controlled device 106. In other examples, though, the speech controlled device 106 may comprise some or all of the speech processing system 108.

Figure 15:
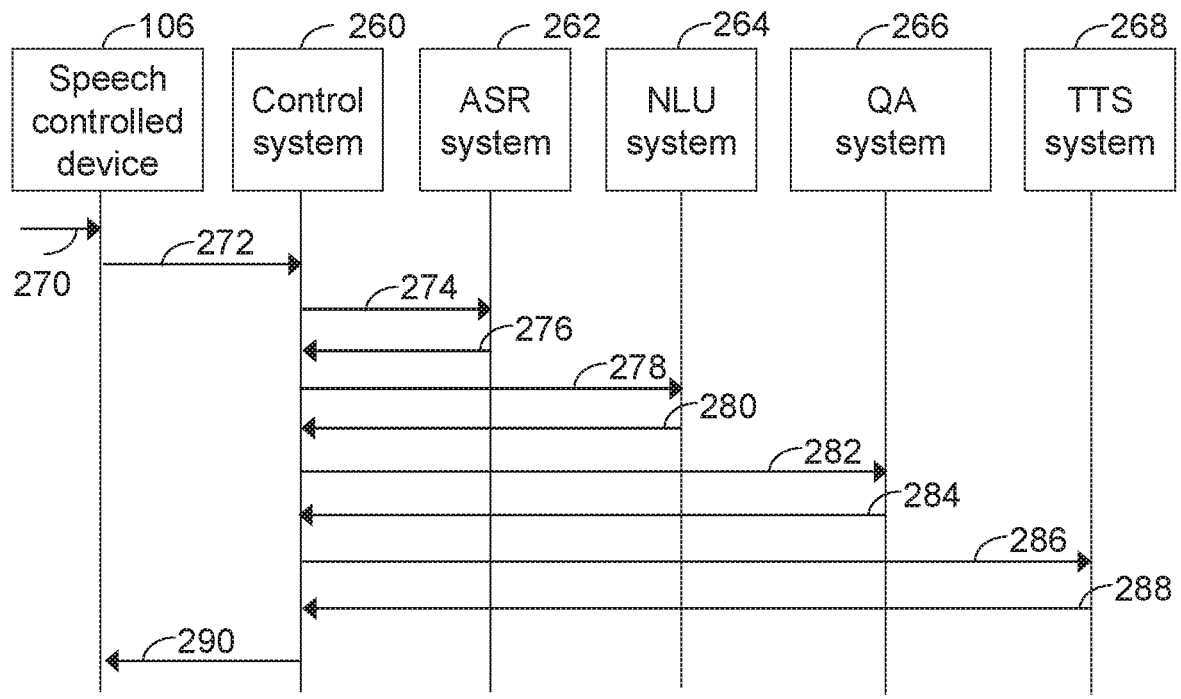
FIG. 15 is a sequence diagram showing an example of communications between components of the example system of FIG. 14.

FIG. 15 is a sequence diagram showing an example of communications between components of the example system of FIG. 14. The speech controlled device 106 receives 270 what may be referred to as a wake word and an utterance 104. A wake word is for example a command that may be used to activate the speech controlled device 106 from a standby mode. Recognition of the wake word may be performed by comparing words received by the speech controlled device 106 to a list of command words or by using limited NLU processing to determine that an intent of the user 104 is to activate the speech controlled device 106. In other examples, though, the user 102 may activate the speech controlled device 106 from the standby mode via other input than a wake word, for example by pressing a button of the speech controlled device 106.

The utterance 104 represents a user input to the speech controlled device 112 and in this example represents a query. The utterance 104 is sent 272 to the control system 260, which may be referred to as an orchestrator, as it orchestrates or coordinates the sending of data and/or commands to other components, such as other components of the speech processing system 108. The control system 260 sends 274 audio data representing the utterance 104 to the ASR system 262. The ASR system 262 converts the audio data to text data as described above with reference to FIG. 14. The ASR system 262 may also detect an endpoint of the utterance 104 and send a message to the speech controlled device 106 to close an audio data stream. This message may be sent via the control system 260.

The ASR system 262 sends 276 the text data to the control system 260. The control system 260 then sends 278 the text data to the NLU system 264 to classify the intent of the text represented by the text data.

After processing of the text data by the NLU system 264, text data output by the NLU system 264 is sent 280 to the control system 260. The control system 260 may then send one or more directives to perform various actions on the speech controlled device 106, such as to play audio data, open a microphone of the speech controlled device 106, pause media that is currently being played by the speech controlled device 106, adjust a volume of audio output by the speech controlled device 106 or other actions, depending on the intent identified by the NLU system 264. The control system 260 may also send further instructions based on the text data. In the example of FIG. 15, the NLU system 264 identifies that the text data represents a query and the control system 260 sends 282 the query to the query-answering system 266. In other examples, though, the query may be sent 282 to the query-answering system 266 before the NLU system 264 has identified that the intent of the user is to ask a query, which may be before the output is sent 280 from the NLU system 264 to the control system 260. The query is sent 282 to the query-answering system 266 along with a command to retrieve an answer to the query, using the query-answering system 266. Further details of receiving or otherwise obtaining an answer to a query from a query-answering system such as that of FIG. 15 are provided above, and may include obtaining a rephrased version of the query and receiving an answer to the rephrased version of the query rather than to the query itself.

Once an answer has been received, the query-answering system 266 returns 284, in this example, third text data representing text including the answer to the control system 260. The control system 260 then sends 286 an instruction to a text to speech (TTS) system 268 to generate audio data using text to speech processing and the third text dat. The TTS system returns 288 the audio data to the control system 260, which then sends 290 the audio data to the speech controlled device 106. The speech controlled device 106 can then play output audio based on the audio data to the user 102.

The examples herein are to be understood as illustrative examples. Further examples are envisaged.

In examples above, a rephrased version of a query is obtained after it is determined that a query-answering system lacks an answer (or a satisfactory answer) to the query. However, in other examples, one or more rephrased versions of the query may be obtained before this. For example, one or more rephrased versions of the query may be obtained during NLU of the query, as the paraphrasing system may form part of an NLU system. This may be more efficient than waiting until after it is determined that the query-answering system lacks a satisfactory answer to the query before obtained the rephrased version of the query. For example, latency and bandwidth latency may be traded off by submitting a call to the paraphrasing system to rephrase the query in parallel with sending the original query to the query-answering system or in parallel with obtaining other understandings of the query using other NLU subsystems of the NLU system. This may reduce latency at the cost of increasing network calls.

In examples in which the paraphrasing system includes a plurality of paraphrasing subsystems, rephrased version(s) of a query may be obtained from each of the plurality of subsystems in parallel. In other examples, though, some or all of the paraphrasing subsystems may be called separately. For instance, a higher precision paraphrasing subsystem may be used to obtain at least one rephrased version of the query in a first pass. Subsequently, a lower precision paraphrasing subsystem may be used to obtain at least one further rephrased version of the query in a second pass. This second pass may be omitted if the first pass results in a satisfactory rephrased version of the query.

Although examples described above involve requesting feedback from users, it is to be appreciated that, in other examples, feedback may be obtained without being explicitly requested from a user. For example, a machine learning model, such as a feedforward or convolutional neural network, may be used to infer feedback from a user's speech after the answer has been returned to them, without asking the user to specifically state whether they are satisfied or not.

Any of the systems or subsystems described herein which may use machine learning (such as generation of rephrased versions of a query using machine learning, or the answer ranker) may be operated using a process which may be referred to as bandit learning. Bandit learning for example includes a stochastic randomization policy rather than producing a completely deterministic output. In such cases, a randomized output may be produced for a small percentage of users (such as 1% of users). Feedback may then be sought, which may indicate that the randomized output nevertheless provides a satisfactory output. This feedback may then be used to update a machine learning model, increasing the rate of learning of the machine learning model beyond that which may be obtained otherwise.

In examples, if even after the query is rephrased, there are no answers or no satisfactory answers to the rephrased version of the query, a message may be returned to the user indicating that the answer to the query is unknown. In other examples, though, further rephrasing may occur.

In the description above, the labels "first", "second" and "third" are used merely for convenience and do not necessarily suggest that further instances of a particular feature are present.

Further examples are envisaged, which include combinations of features of the originally filed claims, as indicated in the following table, which lists various envisaged claim dependencies for the claims originally filed with this application. Hence, in addition to the description above, this table gives basis in the specification for general examples having a combination of features of claims filed herewith:

| Claim as Originally Filed | Envisaged Claim Dependencies |
| --- | --- |
| 1 | — |
| 2 | 1 |
| 3 | 1, 2 |
| 4 | Any one of claims 1 to 3 |
| 5 | 4 |
| 6 | — |
| 7 | 6 |
| 8 | 7 |
| 9 | Any one of claims 6 to 8 |
| 10 | Any one of claims 6 to 9 |
| 11 | Any one of claims 6 to 10 |
| 12 | Any one of claims 6 to 11 |
| 13 | Any one of claims 6 to 12 |
| 14 | Any one of claims 6 to 13 |
| 15 | Any one of claims 6 to 14 |
| 16 | Any one of claims 6 to 15 |
| 17 | Any one of claims 6 to 16 |
| 18 | — |
| 19 | 18 |
| 20 | 17, 18 |

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method comprising:
capturing a spoken utterance comprising a query;
generating first text data representing the spoken utterance;
sending the first text data to a first query-answering subsystem of a query-answering system;
sending the first text data to a second query-answering subsystem of the query-answering system;

receiving an indication from the query-answering system that the query-answering system lacks an answer to the query;

sending the first text data to a paraphrase generator, the paraphrase generator comprising second text data representative of a previously answered query by the query-answering system;

determining, using the first text data and the second text data, that the previously answered query is a rephrased version of the query;

receiving the second text data from the paraphrase generator;

sending the second text data received from the paraphrase generator to the first query-answering subsystem;

sending the second text data received from the paraphrase generator to the second query-answering subsystem;

receiving answer text data from the first query-answering subsystem, the answer text data representative of an answer to the rephrased version of the query;

generating third text data representative of text comprising:
 a first sequence of words representative of the rephrased version of the query; and
 a second sequence of words representative of the answer to the rephrased version of the query; and generating audio data using text to speech processing and the third text data, the audio data representing the third text data.

2. The method according to claim 1, wherein the determining that the previously answered query is the rephrased version of the query comprises:
using a word embedding process to associate first text represented by the first text data with a first vector in a vector space;
using the word embedding process to associate the previously answered query represented by the second text data with a second vector in the vector space;
calculating a separation between a first position in the vector space and a second position in the vector space, the first position represented by the first vector and the second position represented by the second vector;
determining that the separation is less than or equal to a threshold separation; and
on the basis that the separation is less than or equal to the threshold separation, determining that the previously answered query is the rephrased version of the query.

3. The method according to claim 1, wherein the determining that the previously answered query is the rephrased version of the query comprises:
associating the previously answered query with the query, as a candidate paraphrase of the query; and at least one of:
i) analyzing the candidate paraphrase with respect to a whitelisted paraphrase of the query, and determining that the candidate paraphrase matches the whitelisted paraphrase;
or
ii) comparing the candidate paraphrase with a blacklisted paraphrase of the query, and determining that the candidate paraphrase differs from the blacklisted paraphrase; and
in response to at least one of i) or ii), determining that the previously answered query is the rephrased version of the query.

4. The method according to claim 1, comprising:
receiving feedback in response to the audio data, wherein at least one of:

i) the feedback is positive feedback indicating that the rephrased version of the query satisfactorily captures a meaning of the query; and the method comprises storing, in a database, a first entry indicative that the rephrased version of the query is a satisfactory paraphrase which corresponds to the query;
or
ii) the feedback is negative feedback indicating that the rephrased version of the query fails to satisfactorily capture the meaning of the query; and the method comprises storing, in the database, a second entry indicative that the rephrased version of the query is an unsatisfactory paraphrase which does not correspond to the query.

5. The method according to claim 4, comprising:
calculating a first number of entries of the database which are associated with positive feedback;
calculating a second number of entries of the database which are associated with negative feedback;
calculating a difference between the first number and the second number; and one of:
iii) determining that the difference meets or exceeds a first threshold; and adding the rephrased version of the query to a whitelist database as a whitelisted paraphrase;
or
iv) determining that the difference meets or is less than a second threshold; and adding the rephrased version of the query to a blacklist database as a blacklisted paraphrase.

6. A method comprising:
sending query data representative of a query to a first query-answering subsystem of a query-answering system;
sending the query data to a second query-answering subsystem of the query-answering system;
determining, using at least one processor of a computer system, that the query-answering system lacks a satisfactory answer to the query;
after the determining, using the at least one processor, that the query-answering system lacks the satisfactory answer to the query, receiving, from a paraphrase generator, paraphrase data representative of a rephrased version of the query, wherein the rephrased version of the query is a previously answered query answered by at least one of the first query-answering subsystem or the second query-answering subsystem;
sending the paraphrase data received from the paraphrase generator to the first query-answering subsystem;
sending the paraphrase data received from the paraphrase generator to the second query-answering subsystem; and
receiving answer data representative of an answer to the rephrased version of the query from the first query-answering subsystem.

7. The method according to claim 6, wherein at least one of:
the sending the paraphrase data to the first query-answering subsystem comprises sending the paraphrase data to the first query-answering subsystem in a predetermined data format and the sending the paraphrase data to the second query-answering subsystem comprises sending the paraphrase data to the second query-answering subsystem in the predetermined data format; or
the sending the query data to the first query-answering subsystem comprises sending the query data to the first query-answering subsystem in the predetermined data format and the sending the query data to the second query-answering subsystem comprises sending the query data to the second query-answering subsystem in the predetermined data format.

8. The method according to claim 6, comprising:
receiving an intermediate representation of the query, the intermediate representation compatible with the first query-answering subsystem but incompatible with the second query-answering subsystem; and
generating a representation of the query from the intermediate representation, wherein the representation of the query is compatible with the first query-answering subsystem and the second query-answering subsystem.

9. The method according to claim 6, comprising:
generating a distance metric representative of a similarity between the previously answered query and the query; and
determining that the distance metric satisfies a distance condition.

10. The method according to claim 6, comprising:
receiving a first previously answered query and a second previously answered query;
determining that the first previously answered query was answered by the first query-answering subsystem;
determining that the second previously answered query was answered by the second query-answering subsystem;
determining a first precision of the first query-answering subsystem; and
determining that a second precision of the second query-answering subsystem is less than the first precision,
the paraphrase data representative of the first previously answered query.

11. The method according to claim 6, wherein the query data is first query data, the query is a first query and the method comprises:
processing second query data representative of a second query to recognize an entity in the second query and a relation in the second query;
identifying an entity class of the second entity;
identifying a generic query comprising the entity class and the relation; and
replacing the entity class in the generic query with the entity to generate a rephrased version of the second query.

12. The method according to claim 6, comprising:
receiving first paraphrase data representative of a first rephrased version of the query;
determining that a first data structure comprising first data representative of at least one unsatisfactory paraphrase of the query comprises the first paraphrase data;
receiving second paraphrase data representative of the previously answered query, the previously answered query different from the first rephrased version of the query; and
determining that the first data structure lacks the second paraphrase data, the paraphrase data comprising the second paraphrase data.

13. The method according to claim 6, comprising:
receiving first paraphrase data representative of a first rephrased version of the query;
determining that a second data structure comprising second data representative of at least one satisfactory paraphrase of the query lacks the first paraphrase data;
receiving second paraphrase data representative of the previously answered query, the previously answered query different from the first rephrased version of the query; and
determining that the second data structure comprises the second paraphrase data, the paraphrase data comprising the second paraphrase data.

14. The method according to claim 6, comprising:
generating a request for feedback on whether the rephrased version of the query satisfactorily captures a meaning of the query;
receiving feedback data representative of the feedback; and one of:
i) determining that the feedback data represents positive feedback indicative that the rephrased version of the query satisfactorily captures the meaning of the query; and
storing, in a set of records associated with the rephrased version of the query, a first entry indicative that the rephrased version of the query satisfactorily captures the meaning of the query;
or
ii) determining that the feedback data represents negative feedback indicative that the rephrased version of the query fails to satisfactorily capture the meaning of the query; and
storing, in the set of records, a second entry indicative that the rephrased version of the query fails to satisfactorily capture the meaning of the query,
wherein the method further comprises:
calculating a proportion of records of the set of records which are associated with the positive feedback; and
based on the proportion of records, one of:
storing the paraphrase data in a first data structure comprising first data representative of at least one unsatisfactory paraphrase of the query; or
storing the paraphrase data in a second data structure comprising second data representative of at least one satisfactory paraphrase of the query.

15. The method according to claim 6, wherein the paraphrase data is first paraphrase data representative of a first rephrased version of the query, the answer data is first answer data, the answer is a first answer, and the method comprises:
receiving second paraphrase data representative of a second rephrased version of the query;
receiving second answer data representative of a second answer to the second rephrased version of the query;
determining a first relevance of the first answer to the query;
determining that a second relevance of the second answer to the query is less than the first relevance; and
on the basis of the determining that the second relevance of the second answer to the query is less than the first relevance, generating output data based on the first answer data.

16. The method according to claim 6, wherein the determining, using the at least one processor, that the query-answering system lacks the satisfactory answer to the query comprises determining, using the at least one processor, that the query-answering system lacks the satisfactory answer to the query based on at least one of: a message from the query-answering system indicating that the query-answering system lacks an answer to the query, or a lack of response from the query-answering system within a predetermined time period.

17. A system comprising:
at least one processor;
at least one memory comprising computer program instructions,
the at least one memory and the computer program instructions operable to, with the at least one processor:
  send query data representative of a query to a first query-answering subsystem of a query-answering system;
  send the query data to a second query-answering subsystem of the query-answering system;
  determine that the query-answering system lacks a satisfactory answer to the query;
  after the determining that the query-answering system lacks the satisfactory answer to the query, receive, from a paraphrase generator, paraphrase data indicative of a rephrased version of the query, wherein the rephrased version of the query is a previously answered query answered by at least one of the first query-answering subsystem or the second query-answering subsystem;
  send the paraphrase data received from the paraphrase generator to the first query-answering subsystem;
  send the paraphrase data received from the paraphrase generator to the second query-answering subsystem; and
  receive answer data representative of an answer to the rephrased version of the query from the first query-answering subsystem.

18. The system according to claim 17, wherein the at least one memory and the computer program instructions are operable to, with the at least one processor:
  generate a distance metric representative of a similarity between the previously answered query and the query; and
  determine that the distance metric satisfies a distance condition.

19. The system according to claim 17, wherein the at least one memory and the computer program instructions are operable to, with the at least one processor:
  access a first data structure comprising first data representative of at least one unsatisfactory paraphrase of the query; and
  determine whether the rephrased version of the query corresponds to the at least one unsatisfactory paraphrase of the query.

20. The system according to claim 17, wherein the at least one memory and the computer program instructions are operable to, with the at least one processor:
  access a second data structure comprising second data representative of at least one satisfactory paraphrase of the query; and
  determine whether the rephrased version of the query corresponds to the at least one satisfactory paraphrase of the query.

* * * * *